(12) United States Patent
Reed

(10) Patent No.: US 10,698,827 B2
(45) Date of Patent: Jun. 30, 2020

(54) DYNAMIC CACHE REPLACEMENT WAY SELECTION BASED ON ADDRESS TAG BITS

(71) Applicant: VIA Alliance Semiconductor Co., Ltd., Shanghai (CN)

(72) Inventor: Douglas R. Reed, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 348 days.

(21) Appl. No.: 14/891,336

(22) PCT Filed: Dec. 14, 2014

(86) PCT No.: PCT/IB2014/003225
§ 371 (c)(1),
(2) Date: Nov. 14, 2015

(87) PCT Pub. No.: WO2016/097808
PCT Pub. Date: Jun. 23, 2016

(65) Prior Publication Data
US 2016/0350229 A1    Dec. 1, 2016

(51) Int. Cl.
*G06F 12/0864* (2016.01)
*G06F 12/0893* (2016.01)
(Continued)

(52) U.S. Cl.
CPC ...... *G06F 12/0864* (2013.01); *G06F 12/0893* (2013.01); *G06F 12/126* (2013.01);
(Continued)

(58) Field of Classification Search
CPC . Y02D 10/13; G06F 12/0864; G06F 12/0893; G06F 12/128; G06F 2212/604
See application file for complete search history.

(56) References Cited

U.S. PATENT DOCUMENTS 5,301,296 A * 4/1994 Mohri ................. G06F 12/0886
711/128
5,325,504 A * 6/1994 Tipley ................. G06F 12/0831
711/128
(Continued)

FOREIGN PATENT DOCUMENTS

CN    1632877 A    6/2005
CN    1685320 A    10/2005
(Continued)

OTHER PUBLICATIONS

Wilkerson et al. "Trading off cache capacity for low-voltage operation". Jan. 2009. p. 96-103. IEEE Computer Society. Intel.*
(Continued)

*Primary Examiner* — Tracy A Warren
(74) *Attorney, Agent, or Firm* — McClure, Qualey & Rodack, LLP

(57) ABSTRACT

A cache memory comprising: a mode input indicates in which of a plurality of allocation modes the cache memory is to operate; a set-associative array of entries having a plurality of sets by W ways; an input receives a memory address comprising: an index used to select a set from the plurality of sets; and a tag used to compare with tags stored in the entries of the W ways of the selected set to determine whether the memory address hits or misses; and allocation logic, when the memory address misses in the array: selects one or more bits of the tag based on the allocation mode; performs a function, based on the allocation mode, on the selected bits of the tag to generate a subset of the W ways of the array; and allocates into one way of the subset of the ways of the selected set.

13 Claims, 17 Drawing Sheets

US 10,698,827 B2
Page 2

(51) Int. Cl.
*G06F 12/126* (2016.01)
*G06F 12/128* (2016.01)

(52) U.S. Cl.
CPC ...... *G06F 12/128* (2013.01); *G06F 2212/604* (2013.01); *Y02D 10/13* (2018.01)

(56) References Cited

U.S. PATENT DOCUMENTS

| | | | |
|---|---|---|---|
| 5,754,820 | A | 5/1998 | Yamagami |
| 5,809,562 | A | 9/1998 | Gaskins et al. |
| 5,974,507 | A | 10/1999 | Arimilli et al. |
| 6,138,209 | A | 10/2000 | Krolak et al. |
| 6,192,458 | B1 | 2/2001 | Arimilli et al. |
| 6,223,255 | B1* | 4/2001 | Argade ............ G06F 9/3001 711/120 |
| 6,405,287 | B1* | 6/2002 | Lesartre ............ G06F 12/128 711/128 |
| 6,446,168 | B1* | 9/2002 | Normoyle ......... G06F 12/0864 711/118 |
| 6,516,387 | B1* | 2/2003 | Auracher ......... G06F 12/0848 711/123 |
| 6,643,737 | B1 | 11/2003 | Ono |
| 6,681,295 | B1 | 1/2004 | Root et al. |
| 7,406,579 | B2* | 7/2008 | Blanco ............ G06F 12/0886 711/172 |
| 7,543,113 | B2 | 6/2009 | Walker et al. |
| 9,495,299 | B2 | 11/2016 | Yu et al. |
| 2003/0070045 | A1 | 4/2003 | Dwyer et al. |
| 2003/0179605 | A1* | 9/2003 | Riesenman .......... G06F 12/04 365/189.15 |
| 2004/0098540 | A1* | 5/2004 | Itoh ............... G06F 12/0855 711/118 |
| 2005/0038963 | A1* | 2/2005 | Royer ............. G06F 12/126 711/133 |
| 2006/0026356 | A1* | 2/2006 | Okawa ............ G06F 12/0864 711/128 |
| 2006/0075192 | A1 | 4/2006 | Golden et al. |
| 2007/0153014 | A1 | 7/2007 | Sabol |
| 2007/0260818 | A1 | 11/2007 | Damaraju et al. |
| 2008/0040730 | A1 | 2/2008 | Kang et al. |
| 2009/0006756 | A1 | 1/2009 | Donley |
| 2010/0077153 | A1 | 3/2010 | Archambault et al. |
| 2010/0088457 | A1 | 4/2010 | Goodrich et al. |
| 2010/0180083 | A1 | 7/2010 | Lee et al. |
| 2010/0318742 | A1 | 12/2010 | Plondke et al. |
| 2011/0113411 | A1* | 5/2011 | Yonezu ............ G06F 8/4442 717/153 |
| 2012/0096226 | A1* | 4/2012 | Thompson ........ G06F 12/121 711/136 |
| 2013/0304994 | A1 | 11/2013 | Koob et al. |
| 2014/0047175 | A1 | 2/2014 | Abali et al. |
| 2014/0143499 | A1* | 5/2014 | Olson ............. G06F 12/0802 711/132 |
| 2014/0359223 | A1 | 12/2014 | Yu et al. |
| 2016/0147669 | A1* | 5/2016 | Huang ............ G06F 12/0864 711/128 |
| 2016/0170884 | A1 | 6/2016 | Eddy et al. |
| 2016/0293273 | A1 | 10/2016 | Hooker et al. |
| 2016/0357664 | A1 | 12/2016 | Reed |
| 2016/0357681 | A1 | 12/2016 | Reed |

FOREIGN PATENT DOCUMENTS

| | | | | |
|---|---|---|---|---|
| CN | 101097547 | A | 1/2008 | |
| CN | 103597545 | A | 2/2014 | |
| CN | 104011692 | A | 8/2014 | |
| EP | 0549508 | | 6/1993 | |
| EP | 0950223 | | 10/1999 | |
| EP | 1988466 | A1 * | 11/2008 | .......... G06F 11/1064 |
| JP | 1993020193 | | 1/1993 | |
| JP | 06231044 | | 8/1994 | |
| JP | 1997062582 | | 3/1997 | |
| JP | 2000020396 | | 1/2000 | |
| JP | 2002236616 | | 8/2002 | |
| JP | 2003131945 | | 5/2003 | |
| JP | 2005293300 | | 10/2005 | |
| JP | 2010170292 | | 8/2010 | |
| TW | 200627148 | A | 8/2006 | |
| TW | 200910100 | A | 3/2009 | |
| TW | 201140319 | A | 11/2011 | |
| TW | 201346557 | A | 11/2013 | |
| TW | 201443640 | A | 11/2014 | |
| WO | WO2013098919 | | 4/2013 | |

OTHER PUBLICATIONS

Roth. "Shift operations". Oct. 1996. pp. 1-3. Website: <https://www.cs.uaf.edu/2000/fall/cs301/notes/node53.html>. (Year: 1996).*

Ravindran, Rajiv et al. "Compiler-Managed Partitioned Data Caches for Low Power." Proceedings of the 2007 ACM SIGPLAN/SIGBED Conference on Languages, Compiler, and Tools for Embedded Systems. *LCTES'07*. Jun. 13-15, 2007. pp. 237-247 San Diego, CA.

Yang, Se-Hyun et al. "Dynamically Resizeable Instruction Cache: An Energy-Efficient and High-Performance Deep-Submicron Instruction Cache." Purdue e-Pubs. ECE Technical Reports. Electrical and Computer Engineering. May 1, 2000 pp. 1-32.

Zhang, Chenxi et al. "Two Fast and High-Associativity Cache Schemes." IEEE Micro. Sep./Oct. 1997, pp. 40-49.

PCT/IB2014/003231. International Search Report (ISR) and Written Opinion (WO). Provided by State Intellectual Property Office of the P.R. China, dated Sep. 9, 2015. pp. 1-8.

PCT/IB2014/003176. International Search Report (ISR) and Written Opinion (WO). Provided by State Intellectual Property Office of the P.R. China, dated Aug. 28, 2015. pp. 1-8.

PCT/IB2014/003225. International Search Report (ISR) and Written Opinion (WO). Provided by State Intellectual Property Office of the P.R. China, dated Sep. 9, 2015. pp. 1-8.

Agarwal, Anant et al. "Column-Associative Caches: A Technique for Reducing the Miss Rate of Direct-Mapped Caches." 1993. pp. 179-190. *IEEE*.

\* cited by examiner

FAT MODE

104 MEMORY ADDRESS (MA)

108 MODE = FAT

SELECT 2 SETS,
COMPARE TAGS IN BOTH SELECTED SETS,
ALLOCATE INTO LRU SET OF SELECTED SETS
...
EFFECTIVELY HALVES NUMBER OF SETS AND
DOUBLES NUMBER OF WAYS

DYNAMIC CACHE REPLACEMENT WAY SELECTION BASED ON ADDRESS TAG BITS

CROSS-REFERENCE TO RELATED APPLICATIONS

This application is related to the following U.S. Non-Provisional Applications filed concurrently herewith, each of which is a national stage application under 35 U.S.C. 371 of the correspondingly indicated International Application filed Dec. 14, 2014, each of which is hereby incorporated by reference in its entirety.

| U.S. Non-Provisional Ser. No. | International Application No. |
|---|---|
| 14,891,333 | PCT/IB2014/003231 |
| 14,891,335 | PCT/IB2014/003176 |
| 14,891,336 | PCT/IB2014/003225 |

BRIEF SUMMARY

In one aspect the present invention provides a cache memory, comprising: a mode input that indicates in which of a plurality of allocation modes the cache memory is to operate; a set-associative array of entries having a plurality of sets by W ways, wherein W is an integer greater than one; an input that receives a memory address comprising: an index used to select a set from the plurality of sets; and a tag used to compare with tags stored in the entries of the W ways of the selected set to determine whether the memory address hits or misses in the array; and allocation logic that, when the memory address misses in the array: selects one or more bits of the tag based on the allocation mode; performs a function, based on the allocation mode, on the selected one or more bits of the tag to generate a subset of the W ways of the array; and allocates into one way of the subset of the ways of the selected set.

In another aspect, the present invention provides a method for operating a cache memory having a set-associative array of entries having a plurality of sets by W ways, wherein W is an integer greater than one, the method comprising: receiving a mode input that indicates in which of a plurality of allocation modes the cache memory is to operate; receiving a memory address comprising: an index used to select a set from the plurality of sets; and a tag used to compare with tags stored in the entries of the W ways of the selected set to determine whether the memory address hits or misses in the array; and when the memory address misses in the array: selecting one or more bits of the tag based on the allocation mode; performing a function, based on the allocation mode, on the selected one or more bits of the tag to generate a subset of the W ways of the array; and allocating into one way of the subset of the ways of the selected set.

In yet another aspect, the present invention provides a method for operating a set associative cache memory, the method comprising: operating the cache memory in a current allocation mode of a plurality of allocation modes; wherein in each allocation mode of the plurality of allocation modes, upon a miss of a memory address in the cache memory, the cache memory allocates into one way of any of a subset of the ways of a set of the cache memory selected using an index portion of the memory address; wherein in each allocation mode of the plurality of allocation modes the subset is determined by a different function of one or more bits of a tag portion of the memory address; and monitoring effectiveness of the cache memory while operating in the current allocation mode and changing the current allocation mode to a different one of the plurality of allocation modes when the effectiveness is below a threshold.

DETAILED DESCRIPTION OF THE EMBODIMENTS

Modern processors are called upon to execute programs that process data sets having widely varying characteristics and that access the data in widely different manners. The data set characteristics and access patterns impact the effectiveness of cache memories of the processor. The effectiveness is primarily measured in terms of hit ratio.

In addition to its size, the associativity of a cache memory can greatly affect its effectiveness. The associativity of a cache memory refers to the possible locations, or entries, of the cache into which a cache line may be placed based on its memory address. The greater the number of possible locations a cache line may be placed into, or allocated into, the greater the associativity of the cache. Some programs benefit from cache memories with greater associativity and some programs benefit from cache memories with lesser associativity.

Embodiments are described in which a cache memory can be dynamically configured during operation of the processor to vary its associativity to be greater than its normal mode associativity and/or to be less than its normal associativity.

Figure 1:
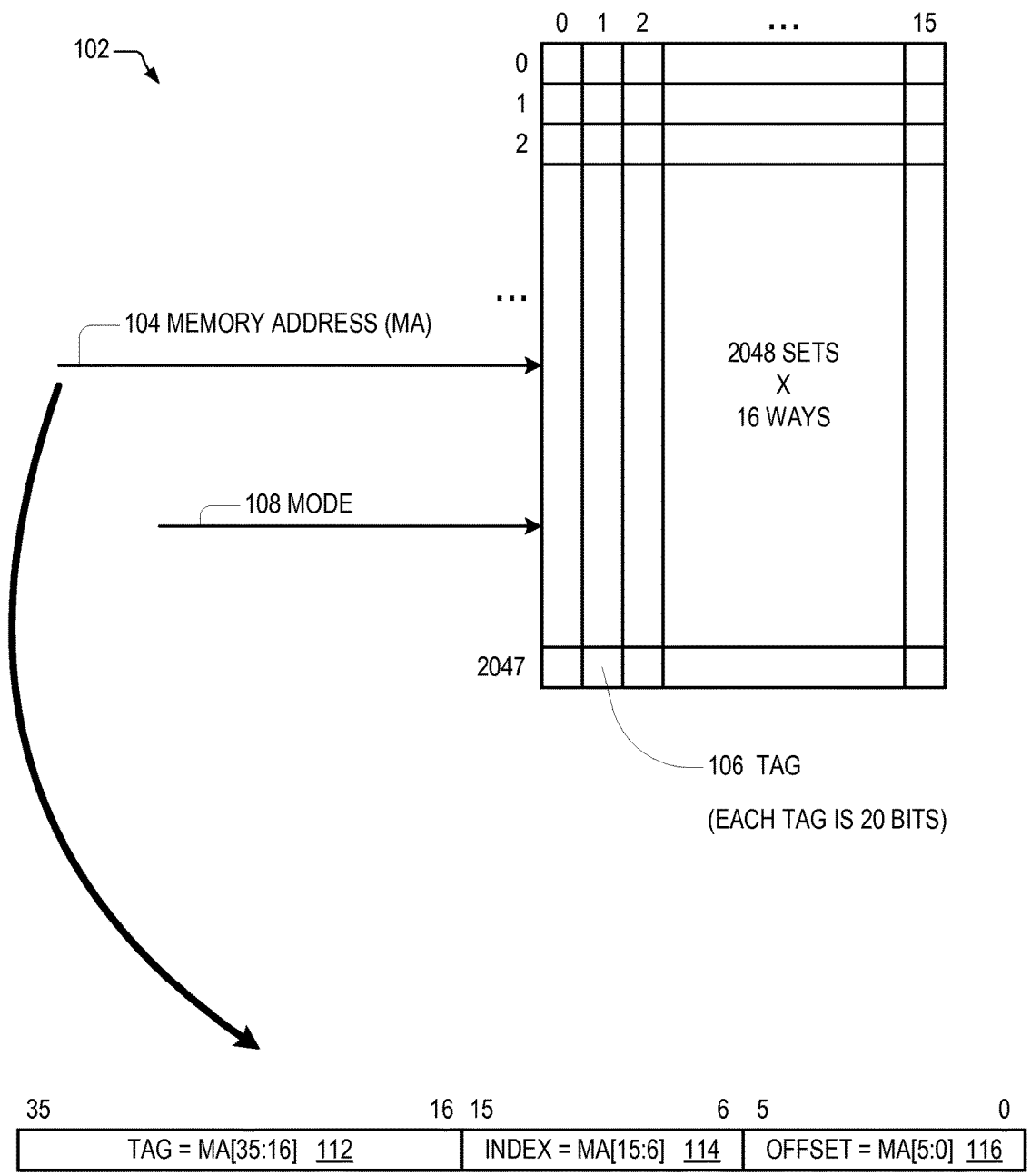
FIG. 1 is a block diagram that illustrates a cache memory.

Referring now to FIG. 1, a block diagram that illustrates a cache memory 102 is shown. The cache memory 102 receives a memory address (MA) 104 on an input and a mode 108 on another input. The mode 108 specifies whether the cache memory 102 is to be configured to operate in a "normal" mode, a "fat" mode, or a "skinny" mode. Each of these modes is described in more detail below.

The memory address 104 is decomposed into three portions, each having a plurality of bits: a tag portion 112, an index portion 114 and an offset portion 116. The offset 116 specifies a byte offset into the selected cache line. The use of the tag 112 and index 114 are described in more detail below. For ease of illustration, an example memory address 104 is shown in FIG. 1 that is 36 bits in size and the 36 bits are decomposed as tag 112=MA[35:16], index 114=MA[15:6] and offset 116=MA[5:0]. However, it should be understood that the dynamic variability of the associativity of the cache memory 102, namely transitions between normal, fat and skinny modes, may be performed on cache memories that receive a memory address 104 having different numbers of bits and which is decomposed into different numbers of bits in its tag 112, index 114 and offset 116 portions. The number of bits in the offset 116 specifies the cache line size (e.g., 64 bytes), and the index 114 selects one or two sets of the cache memory 102, depending upon the mode 108, as described below.

The cache memory 102 is designed as a plurality of sets by a plurality of ways. For ease of illustration, an example cache memory 102 is shown in FIG. 1 that has 2048 sets and 16 ways. However, it should be understood that the dynamic associativity variability described herein may be performed on cache memories having different numbers of sets and different numbers of ways. Each set/way combination identifies an entry in the cache memory 102 that stores a cache line. Each entry includes storage for storing the data of the cache line, as well as storage for storing status of the cache line (e.g., MESI state) and a tag 106 of the cache line. The tag 106, in combination with the set number in which the cache line resides, specifies the memory address of the cache line. In the embodiment of FIG. 1, the tag 106 is 20 bits corresponding to the size of the tag 112 portion of the memory address 104. Preferably, the cache memory 102 comprises separate storage arrays for storing the cache line data, the tags 106 and the replacement information.

As described in more detail below, on a lookup in fat mode the index 114 is used to select two different sets of the cache memory 102 and the full tag 112 of the memory address 104 is compared against the full tag 106 of each way of the two selected sets to detect a hit; whereas, in normal mode and skinny mode the index 114 and the least significant bit (LSB) of the tag 112 are used to select one set of the cache memory 102 and the all but the LSB of the tag 112 of the memory address 104 are compared against all but the LSB of the tag 106 of each way of the selected one set to detect a hit. This doubles the effective associativity and halves the number of ways of the cache memory 102 when configured to operate in fat mode. Conversely, when operating in skinny mode, the cache memory 102 limits the ways into which a cache line may be allocated to a subset of the total ways (e.g., from 16 to 8, to 4, to 2, or to 1) based on one or more of the lower bits of the tag 112, which reduces the effective associativity by two the number of bits of the tag 112 used to limit the subset of ways. In order to transition out of fat mode, a writeback and invalidate operation must be performed on certain cache lines, as described herein. However, the benefit of operating in fat mode for some code streams may be worth the penalty associated with the writeback and invalidate operation. Transitions to or from skinny mode do not require the writeback and invalidate operation.

Figure 2:
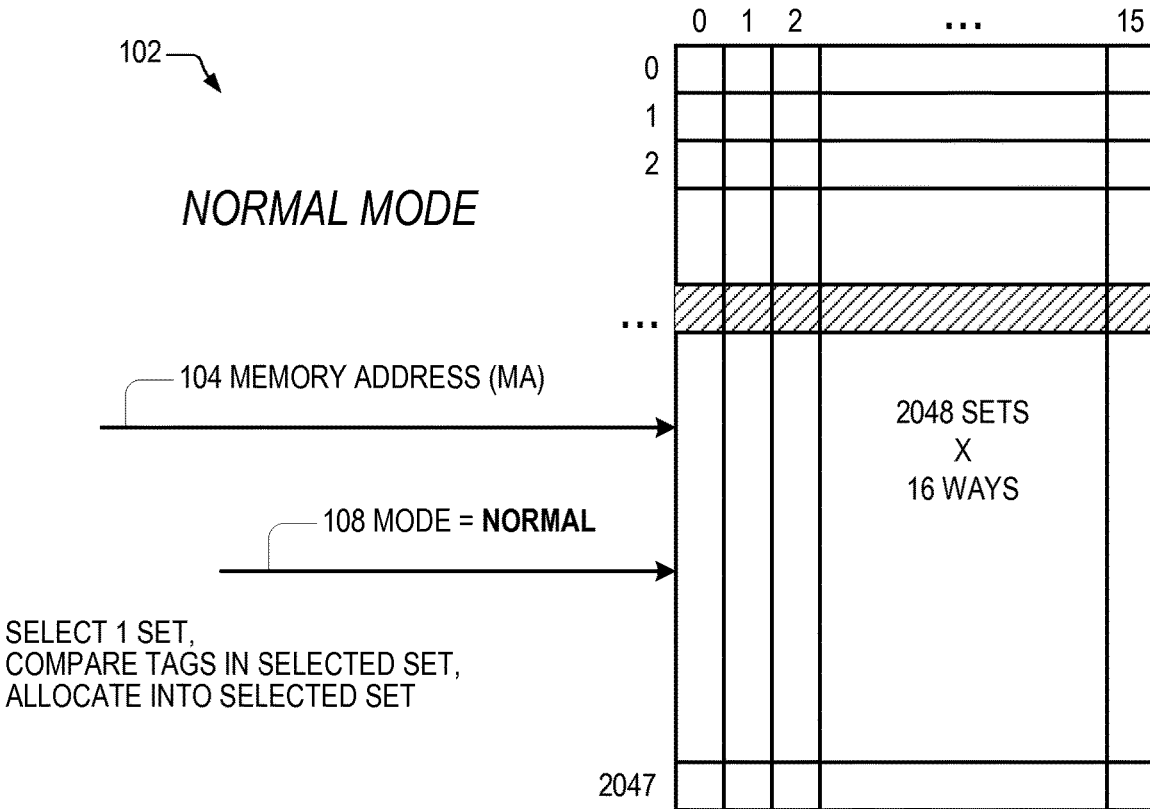
FIG. 2 is a block diagram illustrating the cache memory of FIG. 1 when configured to operate in normal mode.

Referring now to FIG. 2, a block diagram illustrating the cache memory 102 of FIG. 1 when configured to operate in normal mode is shown. More specifically, the mode input 108 specifies a value that indicates the normal mode. In normal mode, the cache memory 102 selects a single set, compares all but the LSB of the entry tag 106 of each way in the set selected by the index 114 with all but the LSB of the memory address 104 tag 112, and on a miss allocates into any one of the ways of the selected set, as described in more detail below with respect to FIG. 3. In the example of FIG. 2, in normal mode the cache memory 102 operates as a 2048 set×16-way set associative cache.

Figure 3:
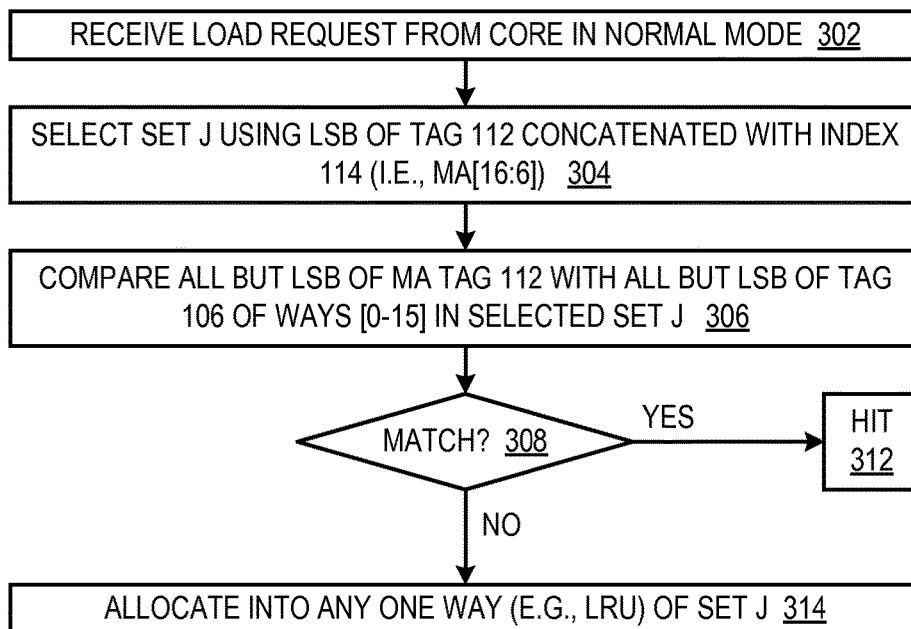
FIG. 3 is a flowchart illustrating operation of the cache memory of FIG. 1 when configured to operate in normal mode.

Referring now to FIG. 3, a flowchart illustrating operation of the cache memory 102 of FIG. 1 when configured to operate in normal mode is shown. Flow begins at block 302.

At block 302, the cache memory 102 receives a load request from a processing core while the mode 108 input indicates normal mode. The load request includes a memory address 104. Flow proceeds to block 304.

At block 304, the cache memory 102 selects a single set, referred to in FIG. 3 as set J, using the LSB of the tag 112 concatenated with the index 114, which in the example of FIG. 1 results in MA[16:6]. Flow proceeds to block 306.

At block 306, the cache memory 102, for each entry in all 16 ways of the selected set J, compares all bits of the memory address 104 tag 112 except the LSB with all bits of the entry tag 106 except the LSB. The compare also checks to see if the entry is valid. Flow proceeds to decision block 308.

At decision block 308, the cache memory 102 determines whether the compare performed at block 306 resulted in a valid match. If so, flow proceeds to block 312; otherwise, flow proceeds to block 314.

At block 312, the cache memory 102 indicates a hit. Flow ends at block 312.

At block 314, the cache memory 102 allocates an entry in the selected set J. Preferably, the cache memory 102 allocates an entry from a way in set J that was least-recently-used (LRU) or pseudo-LRU, although other replacement algorithms may be employed, such as random or round-robin. Flow ends at block 314.

Figure 4:
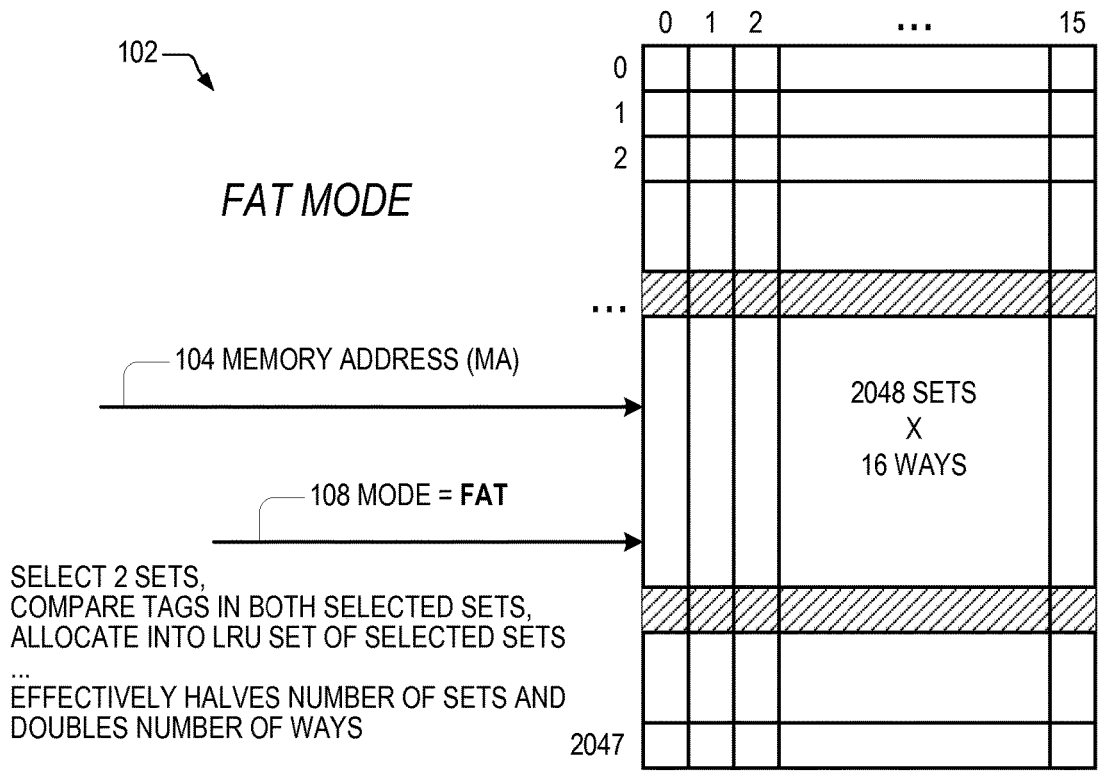
FIG. 4 is a block diagram illustrating the cache memory of FIG. 1 when configured to operate in fat mode.

Referring now to FIG. 4, a block diagram illustrating the cache memory 102 of FIG. 1 when configured to operate in fat mode is shown. More specifically, the mode input 108 specifies a value that indicates the fat mode. In fat mode, the cache memory 102 selects two sets, compares the entry tag 106 of each way in the set selected by the index 114 with the memory address 104 tag 112, and on a miss allocates into any one of the ways of any one of the two selected sets, as described in more detail below with respect to FIG. 5. This effectively doubles the number of ways and halves the number of sets of the cache memory 102. In the example of FIG. 4, in fat mode the cache memory 102 operates as a 1024 set×32-way set associative cache.

Figure 5:
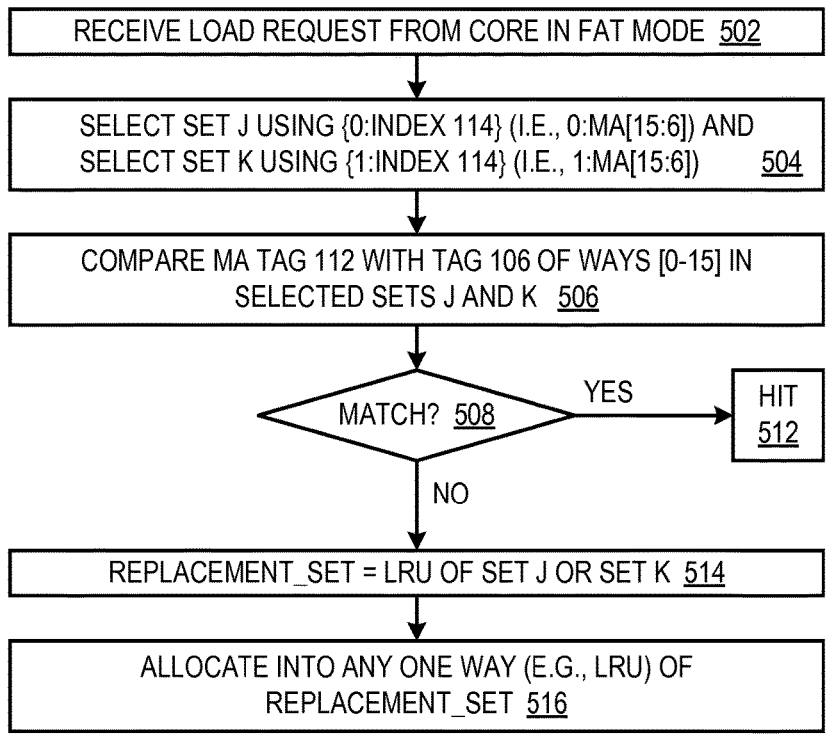
FIG. 5 is a flowchart illustrating operation of the cache memory 102 of FIG. 1 when configured to operate in fat mode.

Referring now to FIG. 5, a flowchart illustrating operation of the cache memory 102 of FIG. 1 when configured to operate in fat mode is shown. Flow begins at block 502.

At block 502, the cache memory 102 receives a load request from a processing core while the mode 108 input indicates fat mode. The load request includes a memory address 104. Flow proceeds to block 504.

At block 504, the cache memory 102 selects two sets, referred to in FIG. 5 as set J and set K. Set J is selected using a binary zero concatenated with the tag 112, which in the example of FIG. 1 results in a binary zero concatenated with MA[15:6]. Set K is selected using a binary one concatenated with the tag 112, which in the example of FIG. 1 results in a binary one concatenated with MA[15:6]. Flow proceeds to block 506.

At block 506, the cache memory 102, for each entry in all 32 ways of the selected sets J and K, compares the memory address 104 tag 112 with the entry tag 106. The compare also checks to see if the entry is valid. Flow proceeds to decision block 508.

At decision block 508, the cache memory 102 determines whether the compare performed at block 506 resulted in a valid match. If so, flow proceeds to block 512; otherwise, flow proceeds to block 514.

At block 512, the cache memory 102 indicates a hit. Flow ends at block 512.

At block 514, the cache memory 102 selects one of sets J and K to be a replacement set. In one embodiment, the cache memory 102 selects the replacement set based on a hash of selected bits of the memory address 104 to a single bit such that if the hash yields a binary zero set J is selected and if the hash yields a binary one set K is selected, which generally serves to select the replacement set in a pseudo-random fashion. In another embodiment, the cache memory 102 selects the replacement set using an extra one or more bits of the replacement information stored for each set in addition to the information stored to select, for example, the LRU way of the set. For example, one extra bit may indicate whether set J or K was LRU. Flow proceeds to block 516.

At block 516, the cache memory 102 allocates an entry in the replacement set. Preferably, the cache memory 102 allocates an entry in the replacement set according to a least-recently-used (LRU) or a pseudo-LRU replacement scheme, although other replacement algorithms may be employed, such as random or round-robin. Flow ends at block 516.

Figure 6:
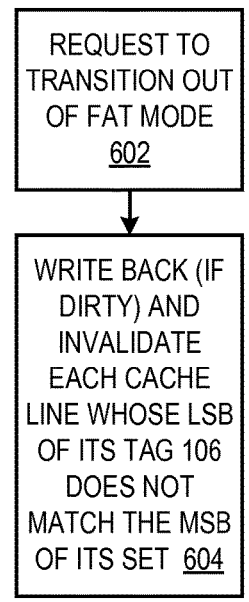
FIG. 6 is a flowchart illustrating operation of the cache memory 102 of FIG. 1 when instructed to transition out of fat mode.

Referring now to FIG. 6, a flowchart illustrating operation of the cache memory 102 of FIG. 1 when instructed to transition out of fat mode is shown. Flow begins at block 602.

At block 602, the cache memory 102 is instructed to transition out of fat mode, i.e., the mode 108 transitions from fat mode to either normal mode or skinny mode. Flow proceeds to block 604.

At block 604, the cache memory 102 searches through each set of the cache memory 102 (i.e., for each set number), and for each entry in the set, compares the LSB of the tag 106 with the MSB of the set number. If there is a mismatch, the cache memory 102 invalidates the entry. However, before invalidating the entry, if the status indicates the cache line is dirty, or modified, the cache memory 102 writes back the cache line data to memory. This operation serves to maintain coherency of the cache memory 102. Flow ends at block 604.

A potential disadvantage of running the fat mode is that it potentially consumes greater power than non-fat modes since two sets worth of tags must be compared. However, the tradeoff of power consumption for additional cache effectiveness may be desirable for some users in some systems. Additionally, in a multi-core processor, if fewer than all the cores are running, the additional tag array accesses (e.g., in the embodiment of FIG. 11, the additional bank access) may be tolerable since the cache memory 102 may be designed to support the requirements of all the cores accessing the cache memory 102.

Figure 7:
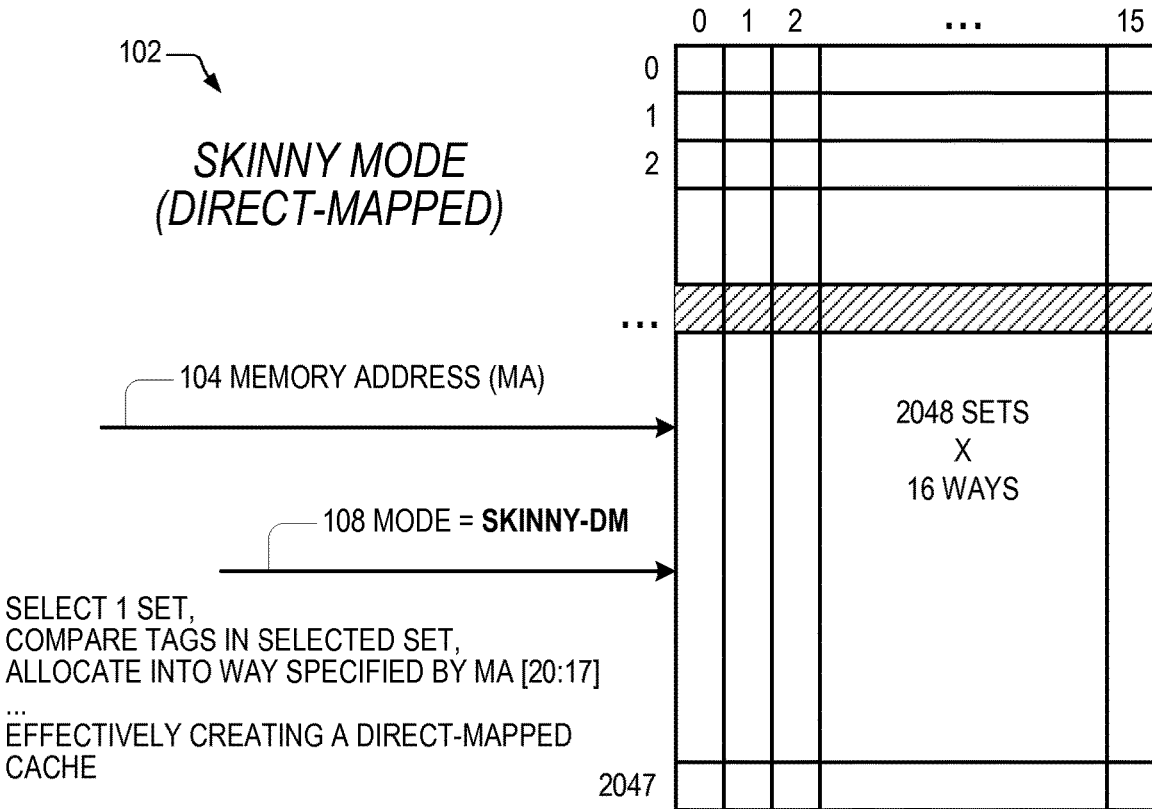
FIG. 7 is a block diagram illustrating the cache memory 102 of FIG. 1 when configured to operate in a skinny mode as a direct-mapped cache.

Referring now to FIG. 7, a block diagram illustrating the cache memory 102 of FIG. 1 when configured to operate in a skinny mode as a direct-mapped cache is shown. More specifically, the mode input 108 specifies a value that indicates the skinny direct-mapped mode, referred to as skinny-DM. In skinny mode, the cache memory 102 selects a single set, compares all but the LSB of the entry tag 106 of each way in the set selected by the index 114 with all but the LSB of the memory address 104 tag 112, similar to normal mode; however, in skinny-DM mode, on a miss the cache memory 102 allocates into only one way of the selected set. The one way is specified by predetermined bits of the memory address 104. Preferably, the predetermined bits are the next most least significant $\log_2 N$ bits of the tag 112, where N is the number of ways of the cache memory 102. Stated alternatively, the predetermined bits are the least significant, excluding the LSB, $\log_2 N$ bits of the tag 112, which in the embodiment of FIG. 1 corresponds to MA[20:17], as described in more detail below with respect to FIG. 8. In the example of FIG. 7, in skinny-DM mode the cache memory 102 operates as a 32768 set direct-mapped cache.

Figure 8:
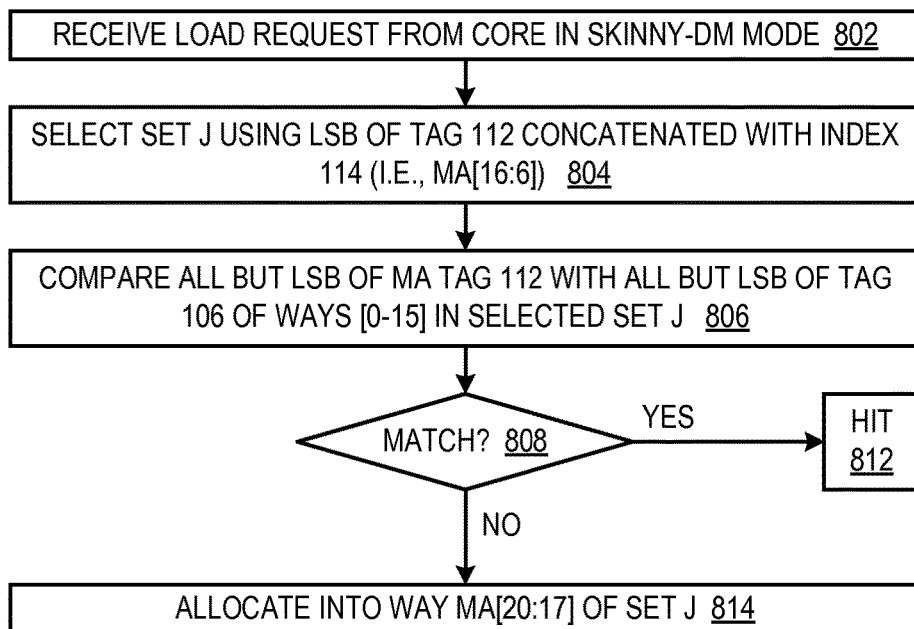
FIG. 8 is a flowchart illustrating operation of the cache memory 102 of FIG. 1 when configured to operate in skinny-DM mode.

Referring now to FIG. 8, a flowchart illustrating operation of the cache memory 102 of FIG. 1 when configured to operate in skinny-DM mode is shown. Flow begins at block 802.

At block 802, the cache memory 102 receives a load request from a processing core while the mode 108 input indicates skinny-DM mode. The load request includes a memory address 104. Flow proceeds to block 804.

At block 804, the cache memory 102 selects a single set, referred to in FIG. 8 as set J, using the LSB of the tag 112 concatenated with the index 114, which in the example of FIG. 1 results in MA[16:6]. Flow proceeds to block 806.

At block 806, the cache memory 102, for each entry in all 16 ways of the selected set J, compares all bits of the memory address 104 tag 112 except the LSB with all bits of the entry tag 106 except the LSB. The compare also checks to see if the entry is valid. Flow proceeds to decision block 808.

At decision block 808, the cache memory 102 determines whether the compare performed at block 806 resulted in a valid match. If so, flow proceeds to block 812; otherwise, flow proceeds to block 814.

At block 812, the cache memory 102 indicates a hit. Flow ends at block 812.

At block 814, the cache memory 102 allocates the entry in the way specified by MA[20:17] of the selected set J. In this manner, the cache memory 102 operates as a direct-mapped cache when configured in skinny-DM mode. Flow ends at block 814.

As mentioned above, advantageously, transitions to or from skinny mode do not require the writeback and invalidate operation. However, it should be noted that there may be a slight penalty in terms of the replacement bit values (e.g., LRU or pseudo-LRU bits) for a short time after the transition. For example, when transitioning from skinny mode to normal mode, the replacements bits may not have the expected normal mode LRU values, for example.

Figure 9:
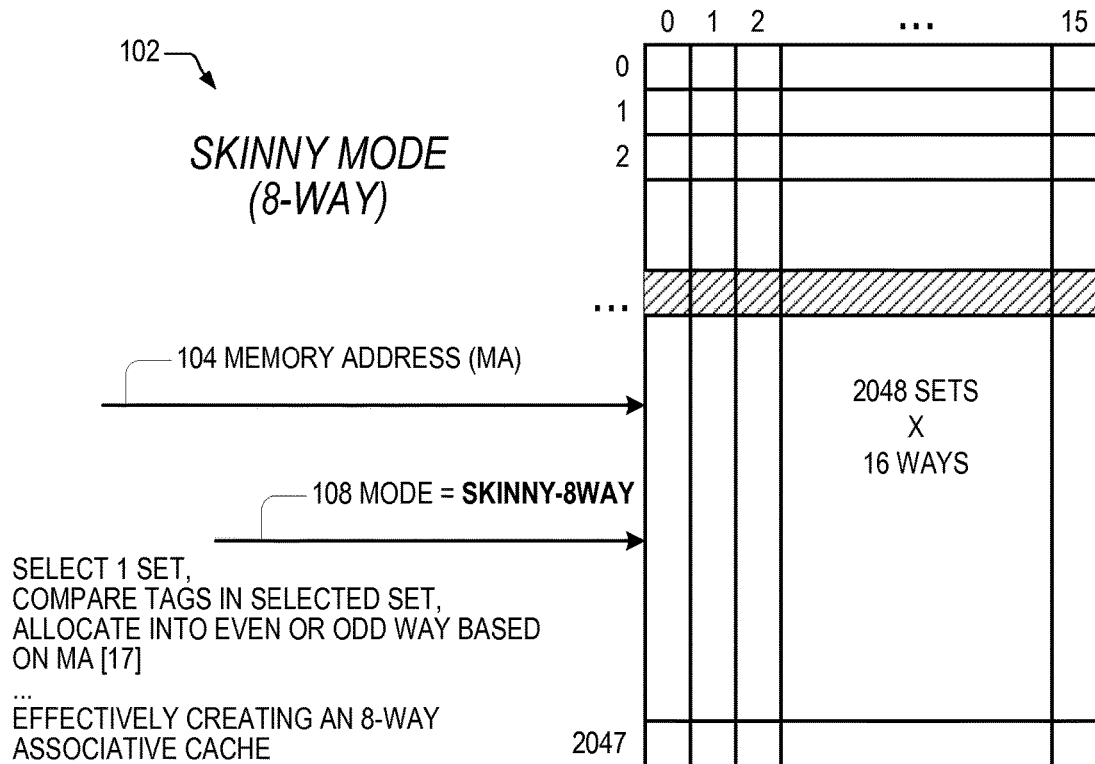
FIG. 9 is a block diagram illustrating the cache memory 102 of FIG. 1 when configured to operate in a skinny mode as an 8-way set associative cache.

Referring now to FIG. 9, a block diagram illustrating the cache memory 102 of FIG. 1 when configured to operate in a skinny mode as an 8-way set associative cache is shown. More specifically, the mode input 108 specifies a value that indicates the skinny 8-way mode, referred to as skinny-8WAY. In skinny-8WAY mode, the cache memory 102 selects a single set, compares all but the LSB of the entry tag 106 of each way in the set selected by the index 114 with all but the LSB of the memory address 104 tag 112, similar to normal mode; however, in skinny-8WAY mode, on a miss the cache memory 102 allocates into any one of a subset of the 16 ways of the selected set. The subset is specified by a predetermined bit of the memory address 104 to be either the 8 odd-numbered ways of the selected set, or the 8 even-numbered ways of the selected set. In one embodiment, the predetermined bit is the next most least significant bit of the tag 112. Stated alternatively, the predetermined bit is the least significant, excluding the LSB, bit of the tag 112, which in the embodiment of FIG. 1 corresponds to MA[17], as described in more detail below with respect to FIG. 10. In other embodiments, the predetermined bit is generated using other methods. For example, the predetermined bit may be generated as a Boolean exclusive-OR (XOR) of multiple bits of the tag 112 (preferably excluding the bit of the tag 112 used to select the set, e.g., MA[16]). This may be particularly advantageous where cache lines are pathologically aliasing into the same set, such as discussed below. Other functions than XOR may also be used to condense multiple bits of the tag 112 into a single bit. In the example of FIG. 9, in skinny-8WAY mode the cache memory 102 operates as a 4096 set×8-way set associative cache.

Figure 10:
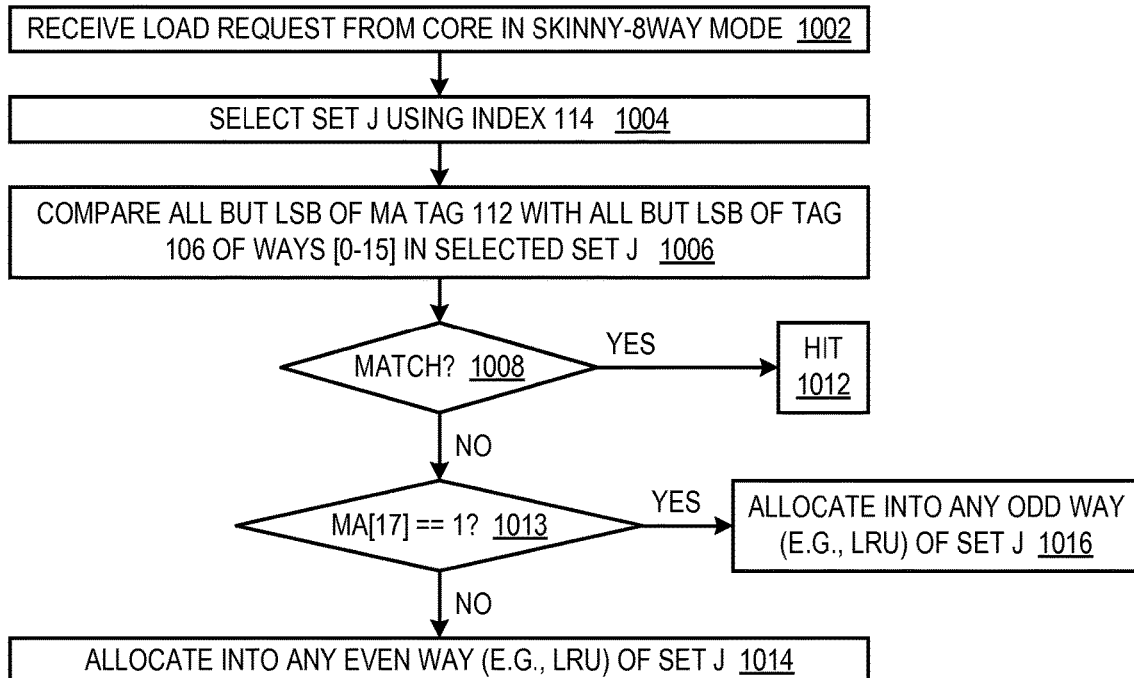
FIG. 10 is a flowchart illustrating operation of the cache memory 102 of FIG. 1 when configured to operate in skinny-8WAY mode.

Referring now to FIG. 10, a flowchart illustrating operation of the cache memory 102 of FIG. 1 when configured to operate in skinny-8WAY mode is shown. Flow begins at block 1002.

At block 1002, the cache memory 102 receives a load request from a processing core while the mode 108 input indicates skinny-8WAY mode. The load request includes a memory address 104. Flow proceeds to block 1004.

At block 1004, the cache memory 102 selects a single set, referred to in FIG. 10 as set J, using the LSB of the tag 112 concatenated with the index 114, which in the example of FIG. 1 results in MA[16:6]. Flow proceeds to block 1006.

At block 1006, the cache memory 102, for each entry in all 16 ways of the selected set J, compares all bits of the memory address 104 tag 112 except the LSB with all bits of the entry tag 106 except the LSB. The compare also checks to see if the entry is valid. Flow proceeds to decision block 1008.

At decision block 1008, the cache memory 102 determines whether the compare performed at block 1006 resulted in a valid match. If so, flow proceeds to block 1012; otherwise, flow proceeds to decision block 1013.

At block 1012, the cache memory 102 indicates a hit. Flow ends at block 1012.

At decision block 1013, the cache memory 102 examines bit MA[17]. If bit MA[17] is a binary one, flow proceeds to block 1016; otherwise, if MA[17] is a binary zero, flow proceeds to block 1014. As described above with respect to FIG. 9, other embodiments are contemplated in which the bit examined at decision block 1013 is a different bit of the tag 112 than MA[17] (i.e., the next to LSB of the tag 112), or which is generated by a function of multiple bits of the tag 112.

At block 1014, the cache memory 102 allocates an entry in any of the even-numbered ways in the selected set. Preferably, the cache memory 102 allocates an entry in the selected even-numbered way according to a least-recently-used (LRU) or a pseudo-LRU replacement scheme, although other replacement algorithms may be employed, such as random or round-robin. Flow ends at block 1014.

At block 1016, the cache memory 102 allocates an entry in any of the odd-numbered ways in the selected set. Preferably, the cache memory 102 allocates an entry in the selected odd-numbered way according to a least-recently-used (LRU) or a pseudo-LRU replacement scheme, although other replacement algorithms may be employed, such as random or round-robin. Flow ends at block 1016.

It should be understood that although two skinny mode embodiments have been described, i.e., skinny direct-mapped mode and skinny 8-way mode, these are described to illustrate skinny mode, which is not limited to these embodiments. With respect to the illustrative embodiment of FIG. 1, for example, a skinny 4-way mode may also be configured in which MA[18:17] is used to select four subsets of four ways each for replacement; and a skinny 2-way mode may be configured in which MA[19:17] is used to select eight subsets of two ways each for replacement. In other embodiments, as mentioned above, other bits of the tag 112 may be used to select the subsets of ways for replacement, and the bits may be inputs to a function (e.g., XOR) to generate bits used to select the subsets of ways for replacement.

Skinny mode may be beneficial for certain pathological programs that make very poor use of a LRU or pseudo-LRU replacement policy. For example, assume the program is marching through memory and has a pathological aliasing effect such that frequently when a load is requested it misses in the cache memory 102 and kicks out the very next line the program is going to need. However, when the effective associativity of the cache memory 102 is reduced by a transition to skinny mode, the problem is avoided.

For example, the program may be accessing a very large data structure in memory in which the lower half aliases into the upper half in the sets of the cache memory 102. However, the lower half and the upper half have different usage patterns that makes LRU replacement ineffective. By reducing the effective associativity of the cache memory 102 via skinny mode-8WAY, half the data structure is effectively insulated from the other half within the cache memory 102. This type of pathological case may be determined using offline analysis of the program, which may be used to reconfigure the cache memory 102, such as described below with respect to FIGS. 14A-14C.

For another example, assume the program is accessing two data sets that alias into the same set of the cache memory 102 because their addresses are identical except for differences in higher order bits of the tag 112. In this case, it may be beneficial to insulate the replacement policy of one of the data sets from the other. This may be achieved by using bits of the tag 112 that correspond to the higher order bits of the tag 112 that differ among the two data sets to generate the bits used to limit the subset of ways to be selected for replacement. This may be achieved, for example, using the methods described below with respect to FIG. 15 by iterating through different tag 112 address bit choices until increased cache memory 102 effectiveness is achieved, or with respect to FIGS. 14A-14C via offline analysis of the program.

Figure 11:
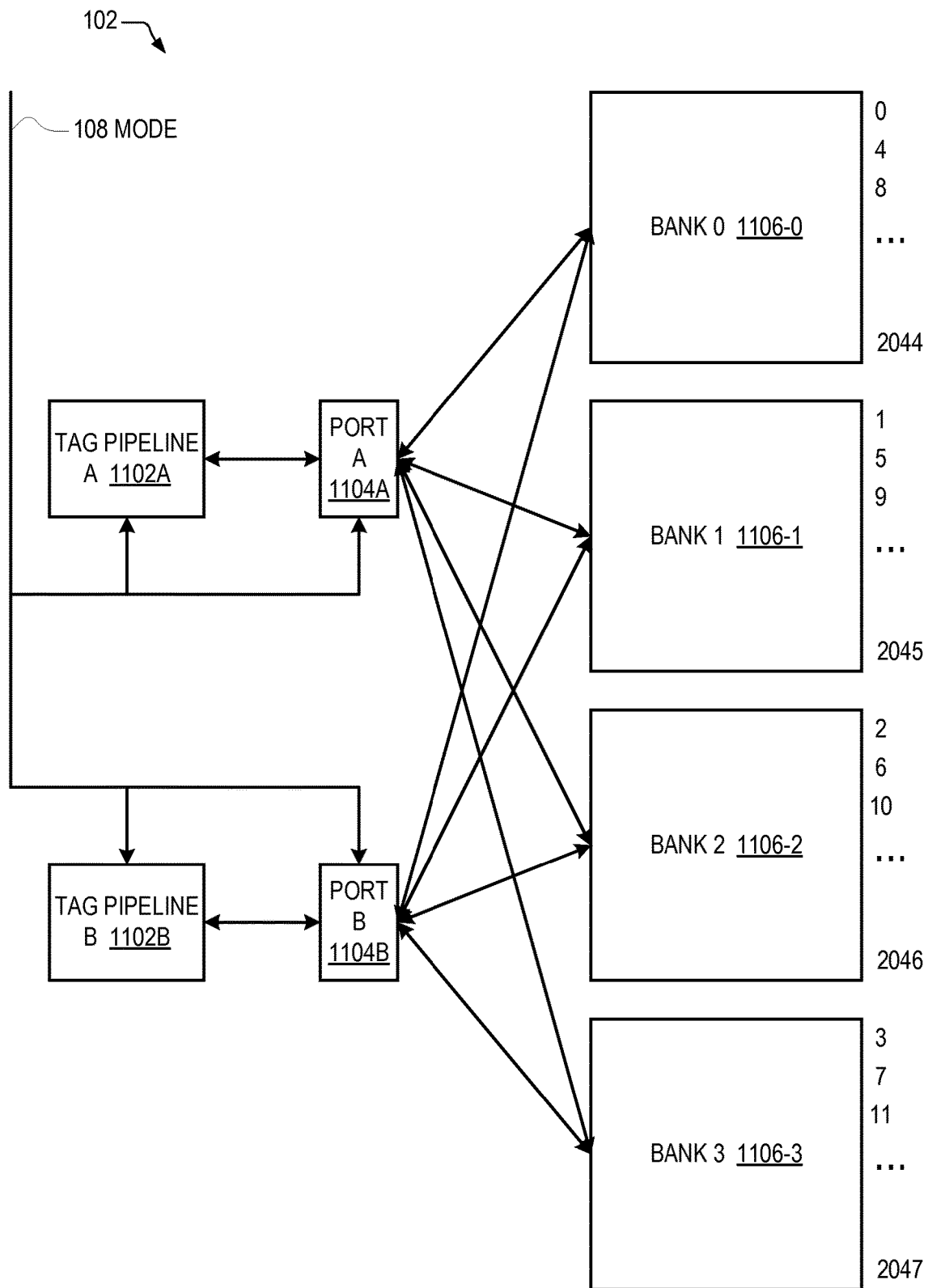
FIG. 11 is a block diagram illustrating in more detail an embodiment of the cache memory 102 of FIG. 1.

Referring now to FIG. 11, a block diagram illustrating in more detail an embodiment of the cache memory 102 of FIG. 1 is shown. In particular, the embodiment of FIG. 11 is a dual-ported banked cache memory 102. The cache memory 102 includes four banks 1106, denoted bank 0 1106-0, bank 1 1106-1, bank 2 1106-2, and bank 3 1106-3. Each bank 1106 has capacity to store one-fourth the sets of the cache memory 102, namely 512 sets. In the embodiment of FIG. 11, bank 0 1106-0 holds the sets whose value modulo 4=0, bank 1 1106-1 holds the sets whose value modulo 4=1, bank 2 1106-2 holds the sets whose value modulo 4=2, and bank 3 1106-3 holds the sets whose value modulo 4=3, as shown.

The cache memory 102 also includes two ports 1104, denoted port A 1104A and port B 1104B. Each port 1104 is coupled to each bank 1106. Each port 1106 receives the mode 108 as an input.

The cache memory 102 also includes two tag pipelines 1102, denoted tag pipeline A 1102A and tag pipeline B 1102B. Tag pipeline A 1102A accesses the banks 1106 through port A 1104A, and tag pipeline B 1102B accesses the banks 1106 through port B 1104B. Each tag pipeline 1102 receives the mode 108 as an input. The selection, or enablement, of the banks 1106 for set selection in the various modes is described in more detail below with respect to FIG. 12, and the generation of a hit by the cache memory 102 in the various modes is described in more detail below with respect to FIG. 13. Preferably, the tag pipelines 1102 include selection logic (not shown) that performs the selection of a set (or two sets in the case of fat mode) as described in the various embodiments herein; comparison logic (not shown) that compares the specified bits of the memory address with the specified bits of the tag stored in the array as described in the various embodiments herein; and allocation logic (not shown) that allocates into the array as described in the various embodiments herein. Additionally, preferably the tag pipelines 1102 include the logic that performs the function on the tag bits specified by the allocation mode input of the embodiments of FIGS. 16-19. Preferably, the tag pipelines 1102 comprise a plurality of stages, each of which performs a different operation to accomplish the set selection, tag comparison, way allocation and way subset determination of the various embodiments described herein.

Port A 1104A and port B 1104B can both be active at the same time as long as they are not both selecting the same bank 1106. This effectively provides a dual-ported cache memory 102 from four single-ported banks 1106. Preferably, arbitration logic of the cache memory 102 attempts to select arbitrating requests from the two tag pipelines 1102 that access non-conflicting banks 1106, particularly when the cache memory 102 is in fat mode.

Figure 12A:
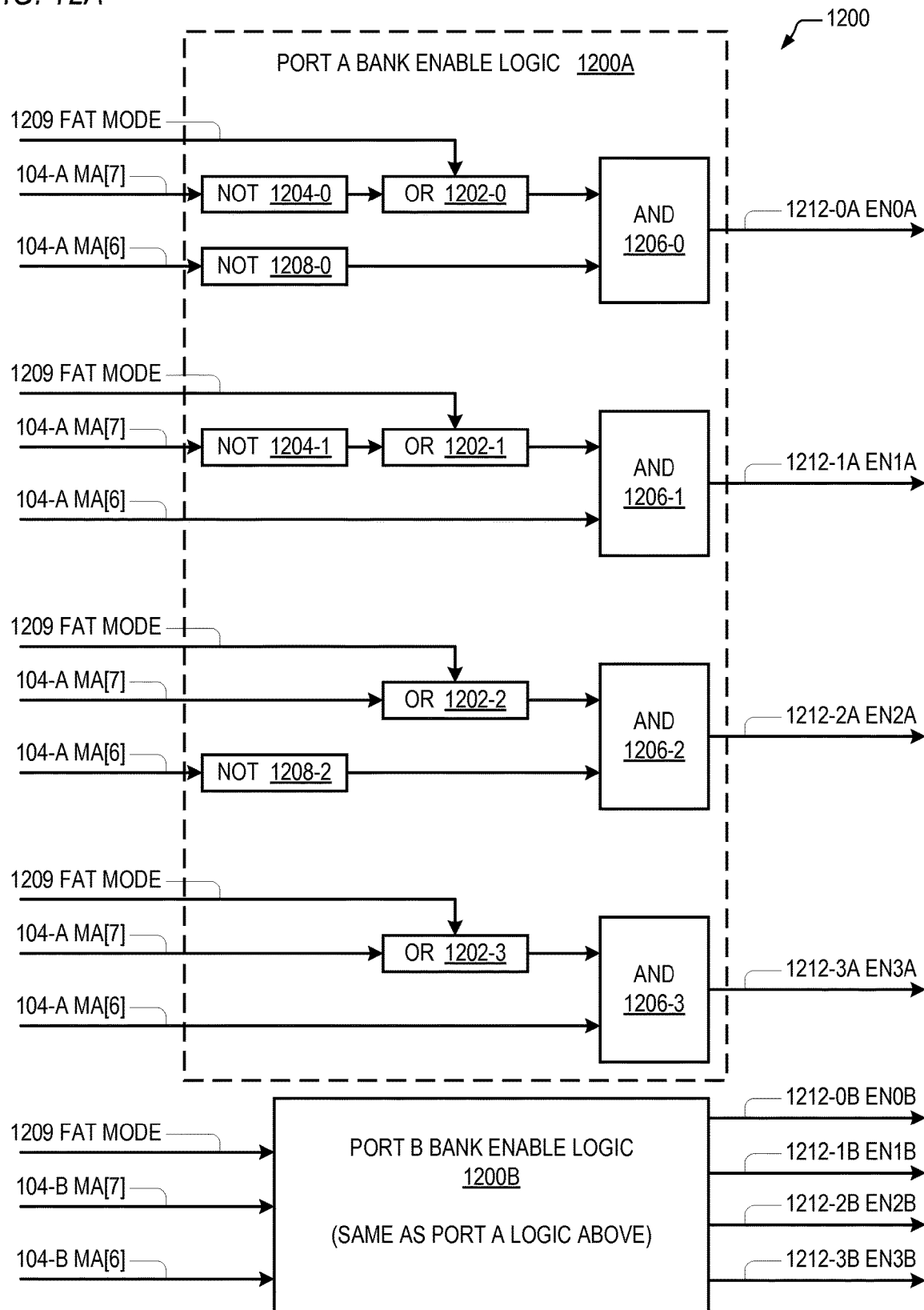
FIGS. 12A and 12B, referred to collectively as FIG. 12, are a block diagram illustrating bank enable logic of the cache memory 102 of FIG. 11.
Figure 12B:
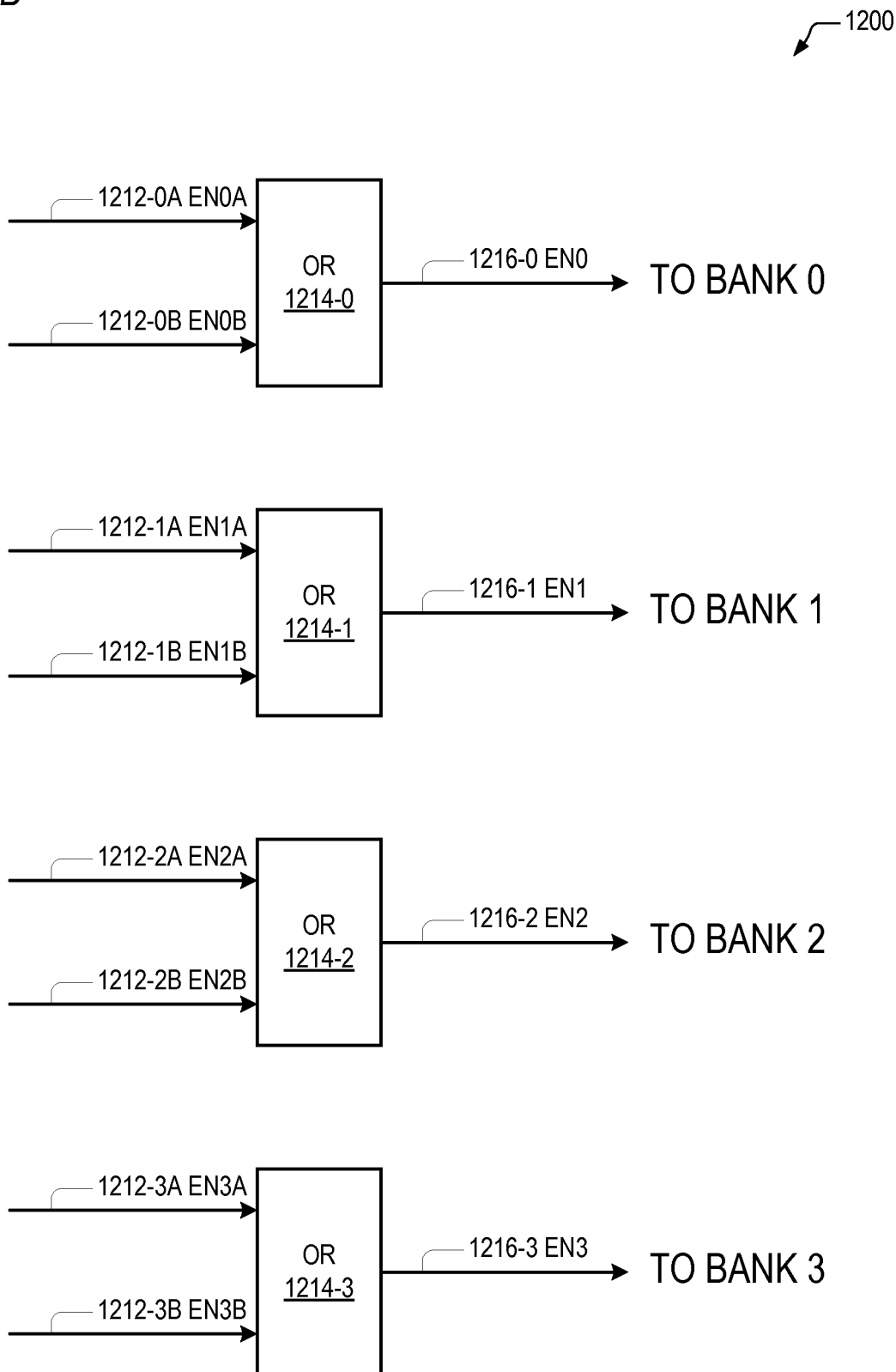

Referring now to FIGS. 12A and 12B, referred to collectively as FIG. 12, a block diagram illustrating bank enable logic 1200 of the cache memory 102 of FIG. 11 is shown. Referring to FIG. 12A, the bank enable logic 1200 includes bank enable logic 1200A that receives a fat mode indicator 1209 and a memory address MA 104-A from tag pipeline A 1102A and in response generates bank enables (ENxA, where x is the bank number) 1212-xA for port A 1104A. The fat mode indicator 1209 is true of the cache memory 102 is operating in fat mode and is false otherwise, and is generated by logic (not shown) that receives the mode indicator 108. The bank enable logic 1200 also includes bank enable logic 1200B that receives the fat mode indicator 1209 and a memory address MA 104-B from tag pipeline B 1102B and in response generates bank enables (ENxB, where x is the bank number) 1212-xB for port B 1104B. The port A bank enable logic 1200A is described in detail, and the port B bank enable logic 1200B is the same, except for its inputs and output, as described above.

The bank enable logic 1200A includes a first inverter 1204-0 that receives MA[7] 104-A, a second inverter 1208-0 that receives MA[6] 104-A, a first OR gate 1202-0 that receives the output of the first inverter 1204-0 and a fat mode indicator 1209, and a first AND gate 1206-0 that receives the output of the first OR gate 1202-0 and the output of the second inverter 1208-0 to generate EN0A 1212-0A, which is the bank 0 1106-0 enable for port A 1104A.

The bank enable logic 1200A also includes a third inverter 1204-1 that receives MA[7] 104-A, a second OR gate 1202-1 that receives the output of the third inverter 1204-0 and the fat mode indicator 1209, and a second AND gate 1206-1 that receives the output of the second OR gate 1202-1 and MA[6] 104-A to generate EN1A 1212-1A, which is the bank 1 1106-1 enable for port A 1104A.

The bank enable logic 1200A also includes a fourth inverter 1208-2 that receives MA[6] 104-A, a third OR gate 1202-2 that receives MA[7] 104-A and the fat mode indicator 1209, and a third AND gate 1206-2 that receives the output of the third OR gate 1202-2 and the output of the fourth inverter 1208-2 to generate EN2A 1212-2A, which is the bank 2 1106-2 enable for port A 1104A.

The bank enable logic 1200A also includes a fourth OR gate 1202-3 that receives MA[7] 104-A and the fat mode indicator 1209, and a fourth AND gate 1206-3 that receives the output of the fourth OR gate 1202-3 and MA[6] 104-A to generate EN3A 1212-3A, which is the bank 3 1106-3 enable for port A 1104A.

Referring to FIG. 12B, the bank enable logic 1200 includes a first OR gate 1214-0 that receives EN0A 1212-0A from the port A bank enable logic 1200A and EN0B 1212-0B from the port B bank enable logic 1200B to generate EN0 1216-0, which is provided as the bank enable to bank 0 1106-0. The bank enable logic 1200 also includes a second OR gate 1214-1 that receives EN1A 1212-1A from the port A bank enable logic 1200A and EN1B 1212-1B from the port B bank enable logic 1200B to generate EN1 1216-1, which is provided as the bank enable to bank 1 1106-1. The bank enable logic 1200 also includes a third OR gate 1214-2 that receives EN2A 1212-2A from the port A bank enable logic 1200A and EN2B 1212-2B from the port B bank enable logic 1200B to generate EN2 1216-2, which is provided as the bank enable to bank 2 1106-2. The bank enable logic 1200 also includes a fourth OR gate 1214-3 that receives EN3A 1212-3A from the port A bank enable logic 1200A and EN3B 1212-3B from the port B bank enable logic 1200B to generate EN3 1216-3, which is provided as the bank enable to bank 3 1106-3.

Figure 13:
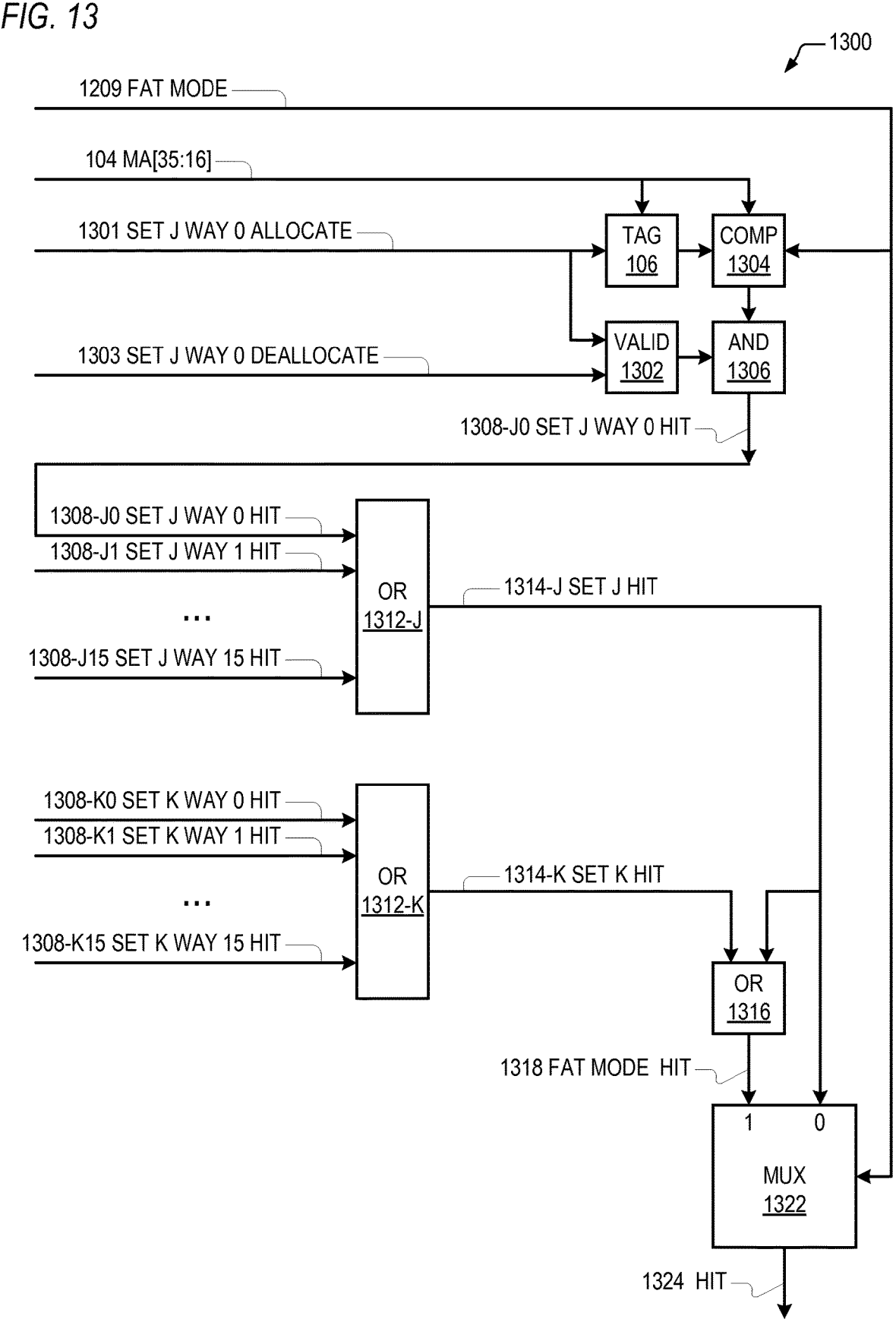
FIG. 13 is a block diagram illustrating hit generation logic of the cache memory 102 of FIG. 11.

Referring now to FIG. 13, a block diagram illustrating hit generation logic 1300 of the cache memory 102 of FIG. 11 is shown. A storage element is shown that holds the tag 106 of an entry of the cache memory 102 of FIG. 1. In the embodiment of FIG. 13, the storage element holds a 20-bit tag 106. Another storage element is shown that holds a valid indicator 1302 of the entry. The tag 106 storage element receives MA[35:16] 104, and when an allocate signal 1301 is true, the MA[35:16] 104 value is written into the tag 106 and the valid indicator 1302 is updated to indicate the entry is valid. Conversely, when a deallocate signal 1303 is true, the valid indicator 1302 is updated to indicate the entry is invalid. As shown in FIG. 13, the allocate signal 1301 and the deallocate signal 1303 are specific to a particular set and way, indicated in FIG. 13 as set J and way 0. However, it should be understood there exists an allocate signal 1301 and deallocate signal 1303 for each set and way of the cache memory 102.

The hit generation logic 1300 includes a comparator 1304 that receives the tag 106 and MA[35:16] 104. The comparator 1304 also receives the fat mode indicator 1209 of FIG. 12. When the fat mode indicator 1209 is true, the comparator 1304 compares all 20 bits of the tag 106 with MA[35:16] to generate its output that indicates whether a match has occurred, such as at block 506 of FIG. 5. However, when the fat mode indicator 1209 is false, the comparator 1304 compares only the upper 19 bits of the tag 106 with MA[35:17] to generate its output, such as at block 306, 806 and 1006 of FIGS. 3, 8 and 10, respectively. An AND gate 1306 receives the output of the comparator 1304 and the valid bit 1302 to generate a set J way 0 hit signal 1308-J0 that indicates whether a hit occurred for set J way 0. As shown in FIG. 13, the set J way 0 hit signal 1308-J0 is specific to a particular set and way, however, it should be understood there exists a set way hit signal 1308 for each set and way of the cache memory 102.

The hit generation logic 1300 also includes a first OR gate 13124 that receives the set J way x hit signal 1308-Jx for each way of set J, where x is the way number, namely for 16 different ways, denoted 0 through 15 in FIG. 13. The OR gate 13124 generates a set J hit signal 1314-J.

The hit generation logic 1300 also includes a second OR gate 1312-K that receives the set K way x hit signal 1308-Kx for each of the 16 ways of set K. Set K is the second set selected when in fat mode, e.g., the set selected by 1:MA [15:6], according to block 504 of FIG. 5. The OR gate 1312-K generates a set K hit signal 1314-K.

The hit generation logic 1300 also includes an OR gate 1316 that receives the set J hit signal 13144 and the set K hit signal 1314-K to generate a fat mode hit signal 1318. The hit generation logic 1300 also includes a mux 1322 that receives the set J hit signal 13144 and the fat mode hit signal 1318 and selects the former if the fat mode signal 1209 is false and the latter otherwise for provision on its output hit signal 1324 that indicates whether a hit in the cache memory 102 has occurred, such as a block 312, 512, 812 and 1012 of FIGS. 3, 5, 8 and 10, respectively.

Figure 14A:
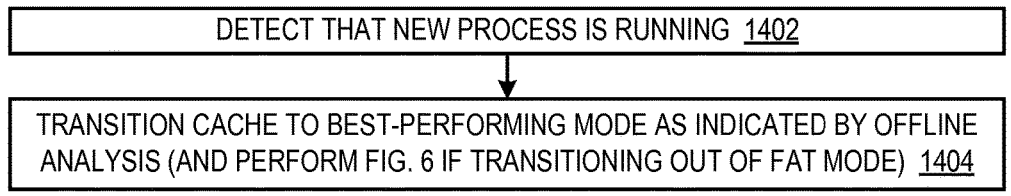
FIG. 14A is a flowchart illustrating operation of a system that includes a processor that comprises the cache memory 102 of FIG. 1.

Referring now to FIG. 14A, a flowchart illustrating operation of a system that includes a processor that comprises the cache memory 102 of FIG. 1 is shown. Flow begins at block 1402.

At block 1402, the system detects that a new process, or program, is running. In one embodiment, system software running on the processor 100 detects the new process, e.g., a device driver monitors the operating system process table. The system software may provide information to the processor that may be used by the processor to detect that the program has entered each of different phases, such as described below with respect to FIG. 14B, and the system software may specify a different mode for each of the phases. In response to the instruction, the processor updates the mode 108 and, if provided, loads the phase detectors (1414 of FIG. 14B) with the initial phase identifiers (1412 of FIG. 14B). In one embodiment, the processor itself detects the new process, e.g., the processor detects a change in a process context identifier (PCID), e.g., that a new value has been loaded into the PCID portion of the x86 instruction set architecture CR3 register. In one embodiment, the processor detects a transition to a new phase of the currently running program, rather than a program change. Flow proceeds to block 1404.

At block 1404, the cache memory 102 is transitioned, e.g., via the mode indicator 108, to a new mode previously determined to be a best-performing mode for the program or phase based on offline analysis of the process that was detected at block 1402. In one embodiment, microcode of the processor changes the mode 108 of the cache memory 102. If the cache memory 102 is transitioning out of fat mode, all memory operations are stopped, the operation described with respect to FIG. 6 is performed, and then memory operations are resumed. In one embodiment, the system software provides the new mode when it detects the new process is running at block 1402. In one embodiment, the processor 100 fetches the new mode from a memory (e.g., local private memory of the processor 100 or system memory) in response to detecting the PCID change or program phase transition; preferably, the processor 100 identifies the new mode from a list using the PCID or phase identifier. The mode information may include different modes for different phases of the program also determined by offline analysis. Flow ends at block 1404.

Figure 14B:
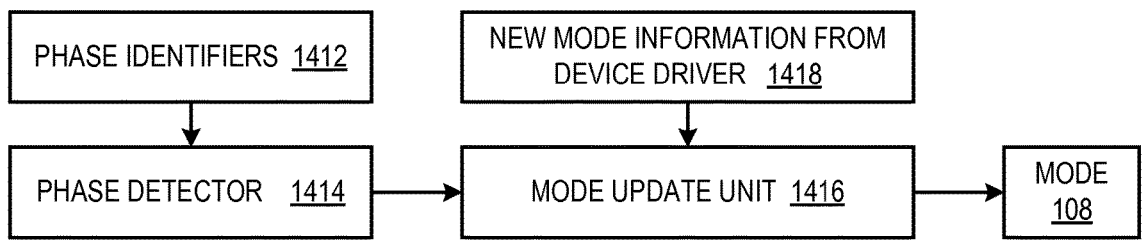
FIG. 14B is a block diagram illustrating elements of the processor that includes the cache memory 102 of FIG. 1.

Referring now to FIG. 14B, a block diagram illustrating elements of the processor that includes the cache memory 102 of FIG. 1 is shown. The processor includes a phase detector 1414 that detects the running program has entered a new phase. The phase detector 1414 makes the determination based on phase identifiers 1412 provided to it, such as by a device driver as described above with respect to FIG. 14A. The phase identifiers 1412 may include an instruction pointer (or program counter) value of an instruction of the program. The instruction may be a subroutine call instruction, in which case the phase identifiers 1412 may also include an instruction pointer (or program counter) value of the target instruction of the call instruction. Furthermore, the phase identifiers 1412 may also include one or more parameter values of the call instruction, e.g., return address, register values and/or stack values. One example of a phase detector, which is referred to therein as a fingerprint unit, is described in more detail in U.S. patent application Ser. Nos. 14/050,687 and 14/050,757, both filed on Oct. 10, 2013, both of which claim priority to U.S. Provisional Application No. 61/880,620, filed on Sep. 20, 2013, each of which is hereby incorporated by reference in its entirety for all purposes. The processor also includes a mode update unit 1416 that is notified by the phase detector 1414 that a new phase has been detected and receives an identifier of the new phase. The mode update unit 1416 also receives the mode information, e.g., from the device driver as described above with respect to FIG. 14A. The mode update unit 1416 updates the mode 108 in the cache memory 102, as described below with respect to FIG. 14C. In one embodiment, the mode update unit 1416 comprises microcode of the processor that is invoked by the phase detector 1414. In an alternate embodiment, the mode update unit 1416 comprises a state machine that receives an indicator from the phase detector 1414 that a new phase has been detected and the identifier of the new phase. Phase analysis is described in more detail with respect to FIG. 22 below.

Figure 14C:
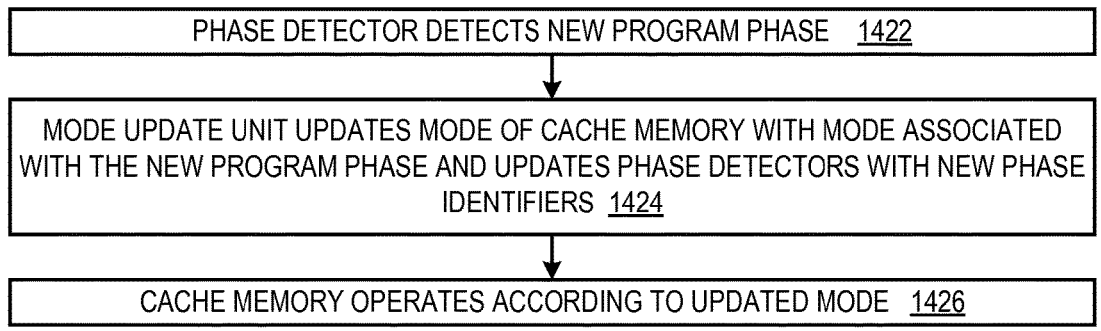
FIG. 14C is a flowchart illustrating operation of the processor of FIG. 14B that includes the cache memory 102 of FIG. 1.

Referring now to FIG. 14C, a flowchart illustrating operation of the processor of FIG. 14B that includes the cache memory 102 of FIG. 1 is shown. Flow begins at block 1422.

At block 1422, the phase detector 1414 of FIG. 14B detects the running program has entered a new phase. In response to detecting the new phase, the phase detector 1414 notifies the mode update unit 1416 of FIG. 14B. Flow proceeds to block 1424.

At block 1424, the mode update unit 1416 looks up the identifier of the new phase received from the phase detector 1414 in the mode information 1418 (e.g., received from the device driver at block 1404 of FIG. 14A) and updates the mode 108 of the cache memory 102 with the mode found in the lookup. Additionally, the mode update unit 1416 updates the phase detectors 1414 with new phase identifiers 1412, as necessary. In one embodiment, the phases to be looked for next depend upon the current phase; hence, the phase identifiers 1412 to be loaded into the phase detector 1414 may be different depending upon the current phase. Flow proceeds to block 1426.

At block 1426, the processor executes the running program and generates memory accesses to the cache memory 102, in response to which the cache memory 102 operates according to the updated mode 108 as performed at block 1424. Flow ends at block 1426.

Figure 15:
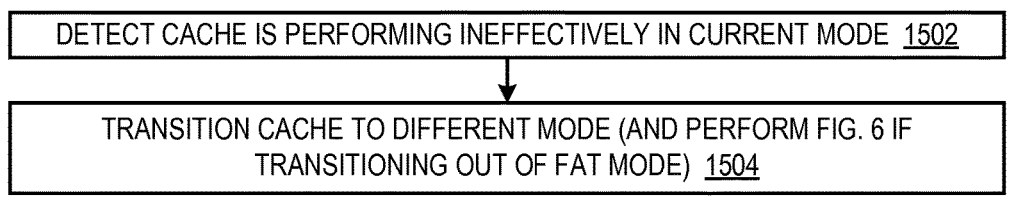
FIG. 15 is a flowchart illustrating operation of a system that includes a processor that comprises the cache memory 102 of FIG. 1.

Referring now to FIG. 15, a flowchart illustrating operation of a system that includes a processor that comprises the cache memory 102 of FIG. 1 is shown. Flow begins at block 1502.

At block 1502, the processor detects that the cache memory 102 is performing ineffectively in its current mode. For example, performance counters may indicate that the cache memory 102 is experiencing a miss rate that exceeds a threshold. Flow proceeds to block 1504.

At block 1504, the cache memory 102 is transitioned to a new mode different than its current mode. In one embodiment, microcode of the processor changes the mode 108 of the cache memory 102. If the cache memory 102 is transitioning out of fat mode, all memory operations are stopped, the operation described with respect to FIG. 6 is performed, and then memory operations are resumed. Preferably, the processor (e.g., microcode) keeps track of automatic changes to the cache memory 102 mode that are made in this fashion in order to avoid thrashing among the modes, such as in the case of a program and/or data set that lends itself to a high miss rate regardless of the mode. In one embodiment, all of the modes (normal, fat, skinny of the different possible skinny modes) are attempted as necessary. In other embodiments, a subset of the modes is attempted. For example, since there is no writeback-invalidate penalty associated with transitions between normal mode and any of the skinny modes or between one skinny mode and another skinny mode, the subset may be limited to these modes and exclude fat mode. The different skinny modes should be understood to include not only different skinny modes with respect to how the subset of ways into which the cache line may be allocated is limited, but also to include different skinny modes that vary the bit or bits of the tag that are chosen upon which to base the limiting of the subset as described above, such as with respect to FIG. 9, e.g., MA[17], XOR(MA[26], MA[23], or MA[22] all in skinny-SWAY mode. Flow ends at block 1504.

Figure 16:
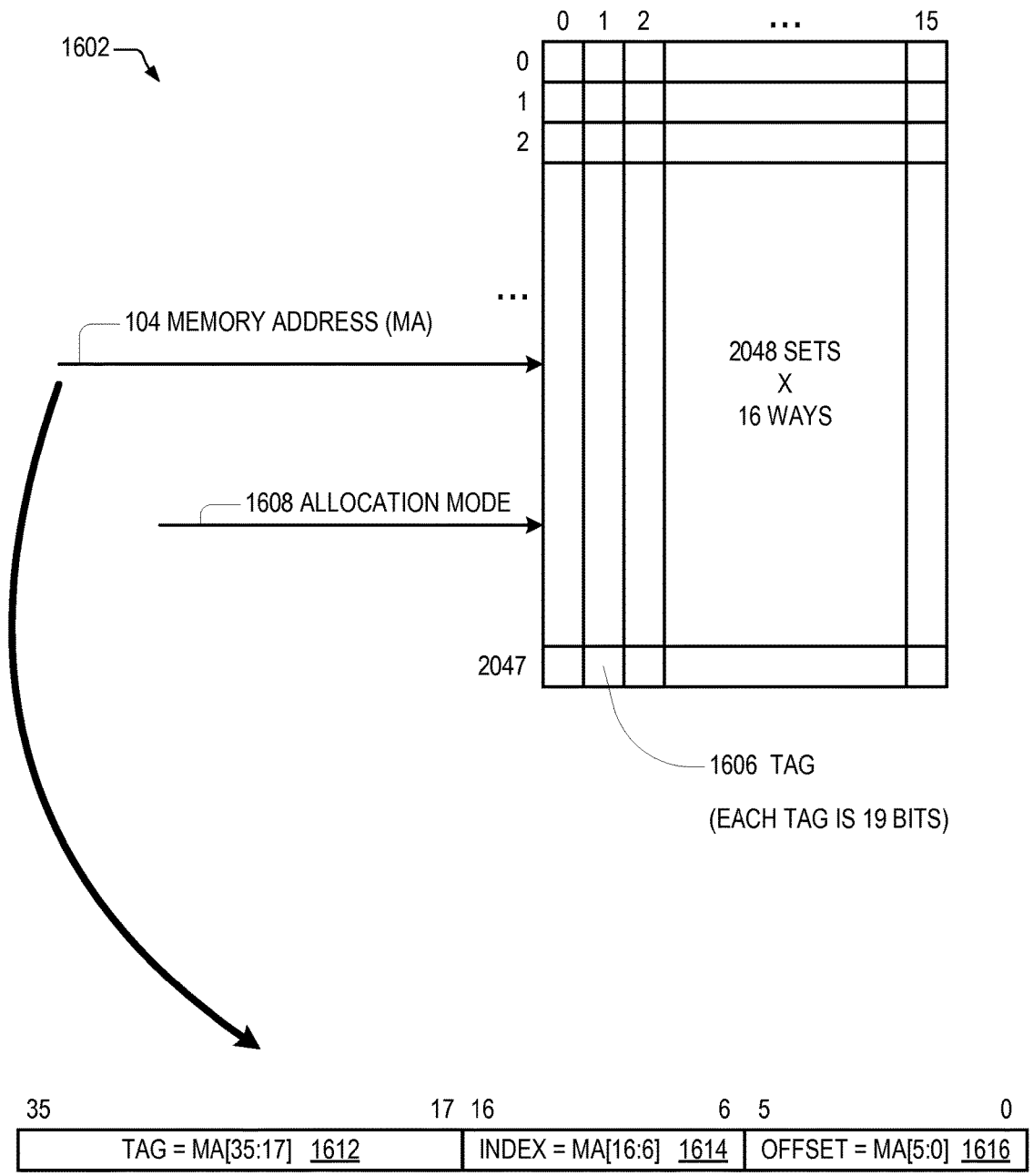
FIG. 16 is a block diagram that illustrates a cache memory.

Referring now to FIG. 16, a block diagram that illustrates a cache memory 1602 is shown. The cache memory 1602 is similar in many respects to the cache memory 102 of FIG. 1. The cache memory 1602 of FIG. 16 advantageously may be dynamically configured during its operation into different allocation modes, specified by an allocation mode input 1608. The allocation mode 1608 selects different functions of one or more bits of the tag of the memory address 104 that determines a subset of ways of the set selected by the index of the memory address 104 into which the cache memory 1602 will allocate into, as described in more detail below.

Similar to the embodiment of FIG. 1, in the embodiment of FIG. 16, the memory address 104 is decomposed into the three portions, a tag portion 1612, an index portion 1614 and an offset portion 1616, however using slightly different bits. For ease of illustration, an example memory address 104 is shown in FIG. 16 that is 36 bits in size and the 36 bits are decomposed as tag 1612=MA[35:17], index 1614=MA[16:6] and offset 1616=MA[5:0]. However, it should be understood that embodiments of the dynamic way selection based on the address tag bits may be performed on cache memories that receive a memory address 104 having different numbers of bits and which is decomposed into different numbers of bits in its tag 1612, index 1614 and offset 1616 portions. Another difference between the illustrative examples of FIGS. 1 and 16 is that the tags 1606 stored in the entries of the cache memory 1602 of FIG. 16 are 19 bits.

Figure 17:
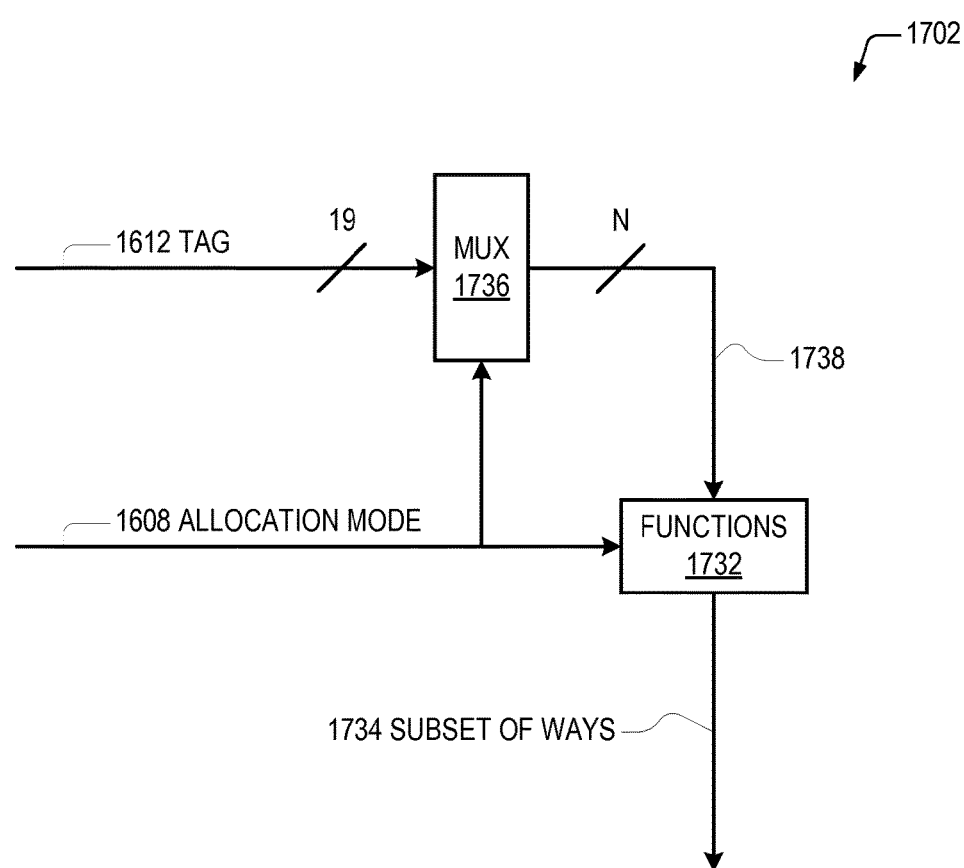
FIG. 17 is a block diagram illustrating logic that selects the subset of ways into which the cache memory 102 allocates based on the tag and allocation mode of FIG. 16.

Referring now to FIG. 17, a block diagram illustrating logic 1702 that selects the subset of ways into which the cache memory 102 allocates based on the tag 1612 and allocation mode 1608 of FIG. 16 is shown. The logic 1702 includes a mux 1736 that receives the bit (e.g., 19) of the tag 1612 and selects one or more of the tag 1612 bits, denoted N bits 1738 in FIG. 17, wherein N is one or more, based on the allocation mode 1608. The logic 1702 also includes combinatorial logic 1732 that selects a function of a plurality of functions based on the allocation mode 1608, and then performs the selected function on the N bits 1738 output by the mux 1736 to generate a vector that indicates the subset of ways 1734 into which the allocation logic of the cache memory 102 allocates into, as described below with respect to FIG. 18.

Examples of the tag 1612 bits selected and the function performed on the selected N bits 1738 are as follows. For one example, the subset is specified by a predetermined bit of the memory address 104 to be either the 8 odd-numbered ways of the selected set, or the 8 even-numbered ways of the selected set. In one example, the predetermined bit is the least significant bit of the tag 1612. In other examples, the predetermined bit is generated using other methods. For example, the predetermined bit may be generated as a Boolean exclusive-OR (XOR) of multiple bits of the tag 1612. This may be particularly advantageous where cache lines are pathologically aliasing into the same set, such as discussed above. Other functions than XOR may also be used to condense multiple bits of the tag 112 into a single bit, such as Boolean OR, Boolean AND, Boolean NOT, or various permutations thereof. For a second example, two or more bits of the tag 1612 are rotated a number of bits specified by the allocation mode 1608 with the result limiting the ways into which a cache line may be allocated to a subset of the total ways, e.g., from 16 to 4, 16 to 2, or 16 to 1 in the cases in which the N bits 1738 are 2, 3, or 4, respectively. Additionally, in the case where the N bits 1738 are 2, 3 or 4, each of the N bits 1738 may be separately generated by a Boolean function of the same or different bits of the tag 1612. Although specific embodiments are described, it should be understood that other embodiments are contemplated for the number and particular bits of the tag 1612 selected by the mux 1736, and other embodiments are contemplated for the particular functions 1732 performed on the selected N bits 1738 to select the subset of ways 1734.

Figure 18:
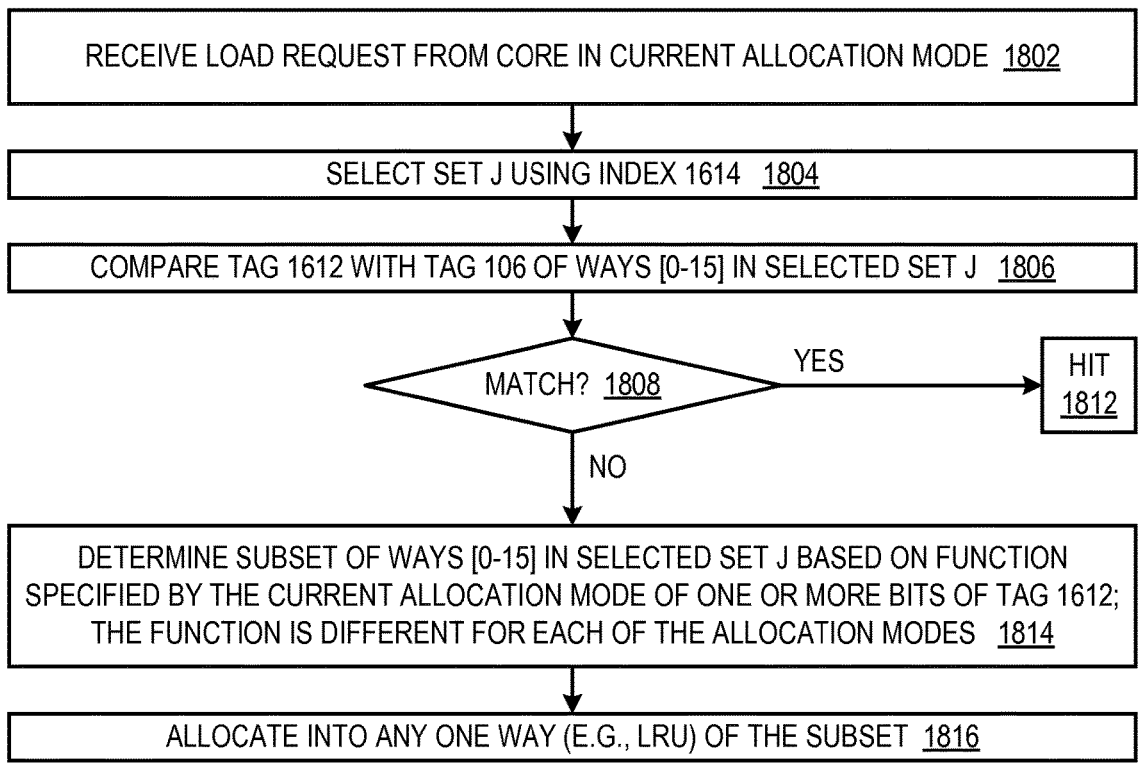
FIG. 18 is a flowchart illustrating operation of the cache memory of FIG. 16.

Referring now to FIG. 18, a flowchart illustrating operation of the cache memory 1602 of FIG. 16 is shown. Flow begins at block 1802.

At block 1802, the cache memory 1602 receives a load request from a processing core while the allocation mode 1608 indicates a current allocation mode. The load request includes the memory address 104 of FIG. 16. Flow proceeds to block 1804.

At block 1804, the cache memory 1602 selects a single set, referred to in FIG. 18 as set J, using the index 1614. Flow proceeds to block 1806.

At block 1806, the cache memory 1602, for each entry in all 16 ways of the selected set J, compares the memory address 104 tag 1612 with the entry tag 1606. The compare also checks to see if the entry is valid. Flow proceeds to decision block 1808.

At decision block 1808, the cache memory 1602 determines whether the compare performed at block 1806 resulted in a valid match. If so, flow proceeds to block 1812; otherwise, flow proceeds to block 1814.

At block 1812, the cache memory 1602 indicates a hit. Flow ends at block 1812.

At block 1814, the logic 1702 of FIG. 17 determines a subset of ways 1734 of the set selected at block 1804 based on the function 1732 specified by the allocation mode 1608 and one or more bits of the tag 1612 specified by the allocation mode 1608. Flow proceeds to block 1816.

At block 1816, the cache memory 1602 allocates into any one way in the selected set J that is in the subset of ways determined at block 1814. Preferably, the cache memory 1602 allocates into a way in the subset that was least-recently-used (LRU) or pseudo-LRU, although other replacement algorithms may be employed, such as random or round-robin. Flow ends at block 1816.

Figure 19:
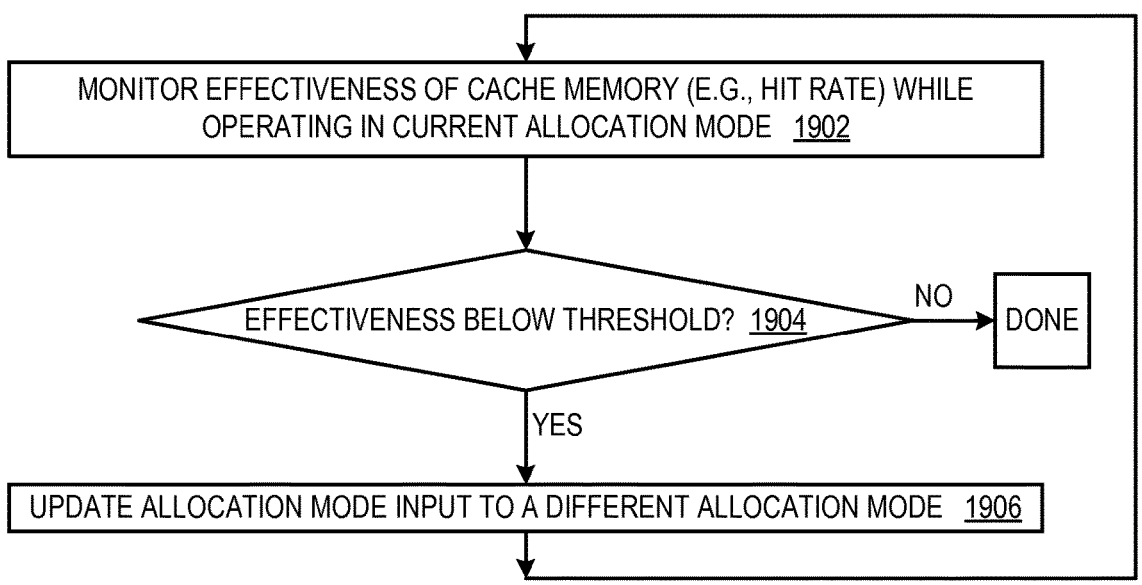
FIG. 19 is a flowchart illustrating operation of a system that includes a processor that comprises the cache memory of FIG. 16.

Referring now to FIG. 19, a flowchart illustrating operation of a system that includes a processor that comprises the cache memory 1602 of FIG. 16 is shown. Flow begins at block 1902.

At block 1902, the processor monitors the effectiveness of the cache memory 102 (e.g., the hit rate of the cache memory 102 over a most recent predetermined period) while operating in a current allocation mode 1608. Flow proceeds to decision block 1904.

At decision block 1904, the processor determines whether the effectiveness of the cache memory 102 is below a threshold. If so, flow proceeds to block 1906; otherwise, flow ends. Preferably, the threshold is programmable, e.g., by system software.

At block 1906, the processor updates the allocation mode 1608 of the cache memory 102 to a new allocation mode different than its current allocation mode. In one embodiment, microcode of the processor updates the allocation mode 1608 of the cache memory 102. Preferably, the processor (e.g., microcode) keeps track of the updates to the allocation mode 1608 that are made in this fashion in order to avoid thrashing among the allocation modes, such as in the case of a program and/or data set that lends itself to a high miss rate regardless of the mode. In one embodiment, all of the allocation modes are attempted as necessary. In other embodiments, a subset of the allocation modes is attempted. Advantageously, there is no writeback-invalidate penalty associated with transitions between the different allocation modes 1608. Flow returns from block 1906 to block 1902.

The configuration of a cache memory mode in the various manners described herein, such as cache memory fat mode, skinny mode, allocation by function of tag replacement bits, may be either by static configuration, by dynamic configuration or both. Generally speaking, the static configuration is pre-silicon. That is, the designers employ intuition, preferably aided by software simulation of the processor design, to determine good configurations, that is, configurations that potentially improve the performance of the processor in general, and of the cache memory in particular. Improving performance of the processor is improving the speed at which the processor executes the program (e.g., reduces the clocks per instruction rate or increases the instructions per clock rate) and/or reduces the power consumption. The programs may be operating systems, executable programs (e.g., applications, utilities, benchmarks), dynamic link libraries, and the like. The software simulation may be employed to perform offline analysis of the execution of programs for which it is desirable to improve performance of the processor, as described below with respect to FIGS. 20 through 22 for example, particularly with respect to cache memory mode configuration. Preferably, the designers determine a static configuration that tends to be good over the set of programs at large. The designers then include the good static configuration into the design that is manufactured into silicon.

In contrast, the analysis to determine dynamic configuration is performed post-silicon, generally speaking That is, after the processor is manufactured, the designers perform offline analysis of a different kind to determine how the processor performs when executing the programs with configurations different than the static, or default, configuration manufactured into silicon. The post-silicon testing may involve a more rigorous, perhaps more brute force, technique in which automated performance regression against a configuration matrix is performed, and then the regression performance data is analyzed, as described below with respect to FIG. 23, for example. The designer may employ the results of the pre-silicon testing for the population of programs as initial seeds to the post-silicon testing, e.g., to attempt to avoid local maxima that are not the global maxima.

Regardless of whether the testing is pre-silicon or post-silicon, with the dynamic configuration testing, good configurations are determined on a per-program basis, or even on a per-program phase basis. Then, when the system, e.g., a device driver, detects a known program is running on the processor (i.e., a program for which the analysis has been performed and a good configuration is known), the system provides the good program-specific configuration to the processor, and the processor updates the cache memory mode with the program-specific configuration in a dynamic fashion while the processor is running. Preferably, the program-specific configuration includes different configurations for different phases of the program, and the processor detects the phase changes and dynamically updates the configuration in response with the phase-specific configuration, as described with respect to FIG. 22, for example.

A program phase, with respect to a given set of characteristics, is a subset of a computer program characterized by a consistent behavior among those characteristics. For example, assume the relevant characteristics are branch prediction rate and cache hit rate, a phase of a program is a subset of the runtime behavior of the program in which the branch prediction rate and cache hit rate are consistent. For instance, offline analysis may determine that a particular data compression program has two phases: a dictionary construction phase and a dictionary lookup phase. The dictionary construction phase has a relatively low branch prediction rate and a relatively high cache hit rate, consistent with building a set of substrings common to a larger set of strings; whereas, the dictionary lookup phase has a relatively high branch prediction rate and a relatively low cache hit rate, consistent with looking up substrings in a dictionary larger than the size of the cache.

In one embodiment, offline analysis is performed using the notion of an "oracle cache," which, as its name implies, knows the future. Given the limited amount of space in the cache memory, the oracle cache knows the most useful data that should be in the cache at any point in time. It may be conceptualized as a cycle-by-cycle or instruction-by-instruction snapshot of the contents of the cache that would produce the highest hit ratio.

First, one generates the sequence of oracle cache snapshots for a program execution and keeps track of the memory access that produced the allocation of each cache line in the snapshots. Then, on a subsequent execution instance of the program, the processor continually updates the cache mode using the information from the snapshots.

When it is impractical to update the cache mode on the granularity of a clock cycle or instruction, one examines the tendencies over much longer time durations, e.g., an entire program or program phase, e.g., by taking averages from the sequence of the program or phase.

Broadly speaking, the idea of the oracle cache is that, because it knows all of the memory accesses in advance, it can pre-execute all of the memory accesses. Then as the program executes, the oracle cache predicts the best set of cache lines to be in the cache at any given point in time. For instance, in the graph of FIG. 21, the oracle cache would predict that the short duration cache line (the line second from the top depicted with a solid line) should not be cached after its last access. Using such analysis, one derives observations about cache modes.

Figure 20:
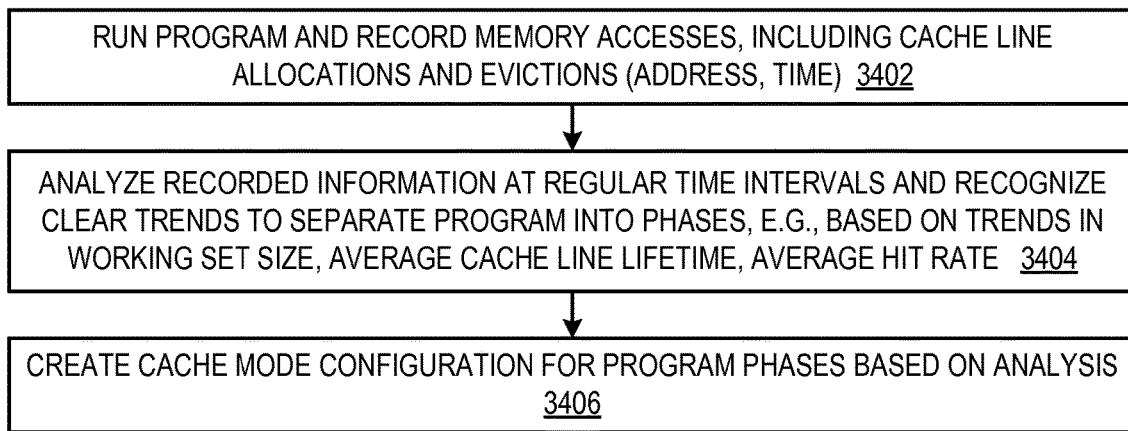
FIG. 20 is a flowchart illustrating generation of cache memory mode configurations for programs and program phases.

Referring now to FIG. 20, a flowchart illustrating generation of cache memory mode configurations for programs and program phases is shown. Flow begins at block 3402.

At block 3402, the designer, preferably in an automated fashion, runs a program and records memory accesses to the cache memory, e.g., 102, 1602, made by the program. Preferably, the allocations, hits and evictions of cache lines are recoded. The memory address and time (e.g., relative clock cycle) of the memory accesses are recorded. Flow proceeds to block 3404.

At block 3404, the designer, preferably in an automated fashion, analyzes the information recorded at block 3402 at regular time intervals and recognizes clear trends to separate the program into phases, e.g., as described below with respect to FIG. 22. For example, clear trends in working set size, average cache line lifetime, average hit rate may be recognized. Flow proceeds to block 3406.

At block 3406, the designer, preferably in an automated fashion, creates configurations for the different program phases based on the analysis performed at block 3404. For example, the configurations may be a cache memory mode. In one embodiment, the analysis to determine the configurations may include analysis similar that described below with respect to FIGS. 21 through 23. It should be understood that some programs might not exhibit clear trends such that they are susceptible to being broken down into distinct phases, in which case a single configuration may suffice for the entire program. Flow ends at block 3406.

Figure 21:
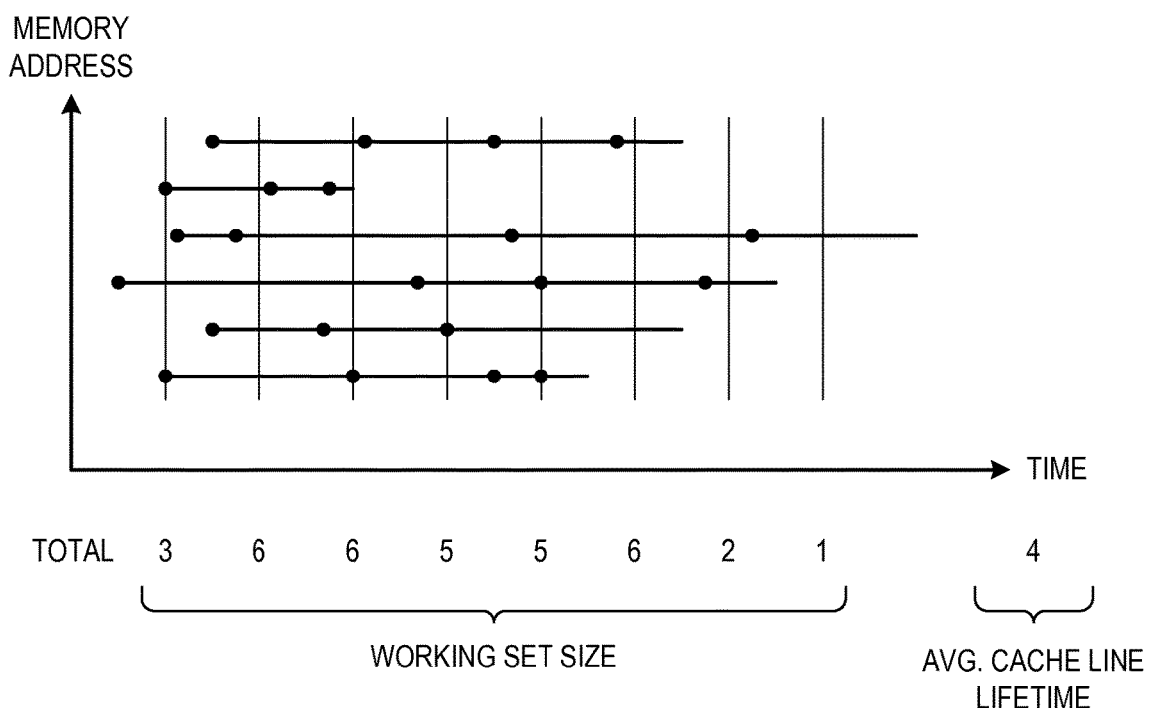
FIG. 21 is a memory access graph and extracted data from the graph.

Referring now to FIG. 21, a memory access graph and extracted data from the graph is shown. The graph plots memory accesses, indicated by dots, in which time is the independent variable shown on the horizontal axis, and memory address is the dependent variable shown on the vertical axis. Horizontal lines correspond to individual cache line at the specified memory address. The left edge of the line signifies the allocation of the cache line, and the right edge of the line signifies the eviction of the cache line from the cache memory.

Below the graph is shown, at each of eight different regular time intervals, the total working set size. The time intervals may be correlated to basic block transfers as described below with respect to FIG. 22, for example, and used to determine program phases and configurations for each of the program phases.

Additionally, observations may be made about how long cache lines tend to be useful, such as average cache line lifetime. The average cache line lifetime is calculated as the sum of the lifetime (from allocation to eviction) of all the cache lines over the phase divided by the number of cache lines. This information can be used to influence the operating mode of the cache memory.

If the oracle cache constrains the number of cached lines to correspond to the intended number of sets and ways that are included in the cache memory, the accuracy of the cache mode and average lifetime observations may increase. Other indicators may also be gathered, such as cache line hits.

Figure 22:
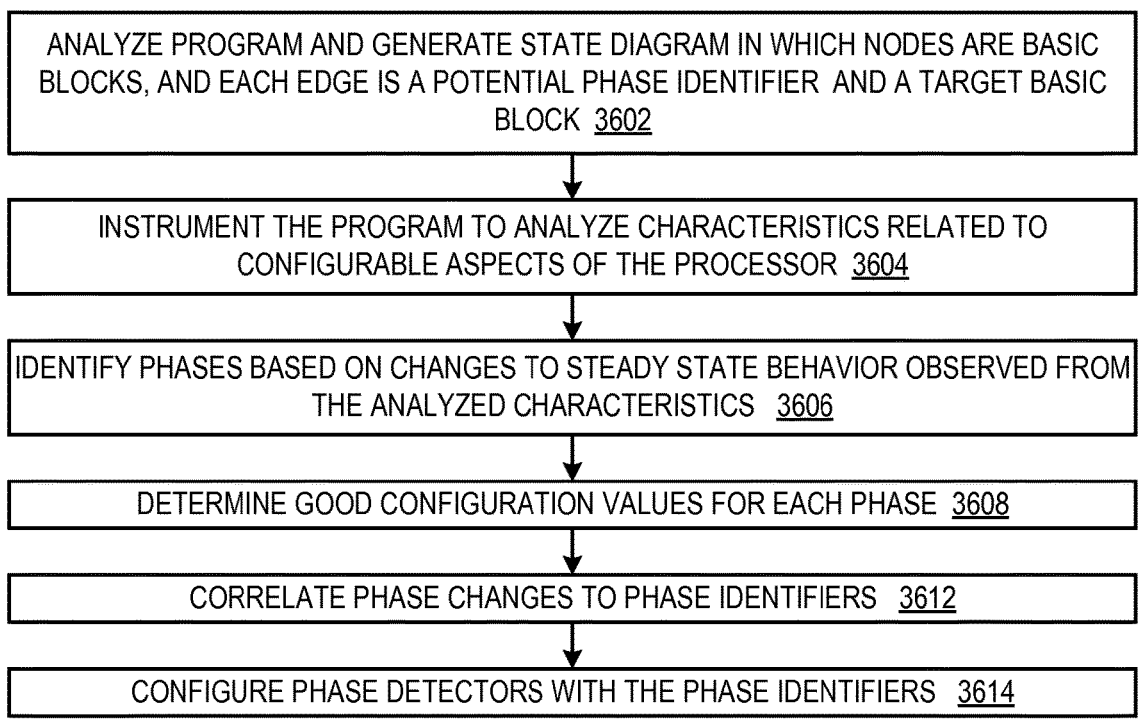
FIG. 22 is a flowchart illustrating phase analysis of a program.

Referring now to FIG. 22, a flowchart illustrating phase analysis of a program is shown. The phase analysis is a form of offline analysis that may be used to determine good configurations of configurable aspects of the processor, such as its cache memory or prefetchers. Flow begins at block 3602.

At block 3602, a program for which it is desirable to improve performance by the processor when executing the program is analyzed and broken down to generate state diagrams. The nodes of the state diagram are basic blocks of the program. Basic blocks are sequences of instructions between program control instructions (e.g., branches, jumps, calls, returns, etc.). Each edge in the stage diagram is a target basic block to which the edge leads and state change information, which may become a phase identifier, as described more below. A phase identifier may include the instruction pointer (IP), or program counter (PC), of a control transfer instruction, a target address of the control transfer instruction, and/or the call stack of a control transfer instruction. The call stack may include the return address and parameters of the call. The program phases are portions of the programs that comprise one or more basic blocks. Flow proceeds to block 3604.

At block 3604, the program is instrumented to analyze characteristics related to configurable aspects of the processor such as cache memory configuration modes. Examples of the characteristics include cache hit rate, branch prediction accuracy, working set size, average cache line lifetime, and cache pollution (e.g., the number of cache lines prefetched but never used). Flow proceeds to block 3606.

At block 3606, the program is executed with a given configuration, e.g., of cache memory and/or prefetcher, and phases of the program are identified by observing steady state behavior in the analyzed characteristics of block 3604. For example, assume cache hit rate is the analyzed characteristic of interest, and assume the cache hit rate changes from 97% to 40%. The cache hit rate change tends to indicate that the cache memory configuration was good for the program prior to the change and not good for the program after the change. Thus, the sequence of basic blocks prior to the cache hit rate change may be identified as one phase and the sequence of basic blocks after the cache hit rate change may be identified as a second phase. For another example, assume working set size is the analyzed characteristic of interest, then significantly large shifts in working set sizes may signal a desirable location in the program to identify a phase change. Flow proceeds to block 3608.

At block 3608, once the phases are identified, good configurations or configuration values, are determined for each phase. For example, various offline analysis techniques may be used, such as the method described above with respect to FIGS. 20 and 21 or below with respect to FIG. 23. Flow proceeds to block 3612.

At block 3612, phase identifiers are correlated to the phase changes. The state change information, or potential phase identifiers, of the basic block transition described above at which a change in the analyzed characteristic occurred are recorded along with the good configuration values determined at block 3608 for the program so the information may be provided to the processor when it is detected, e.g., by a device driver, that the analyzed program is about to run. Flow proceeds to block 3614.

At block 3614, after receiving the information associated with the analyzed program, the processor loads the phase detectors 1414 with the phase identifiers 1412 of FIG. 14B as described above with respect to FIGS. 14A through 14C. Flow ends at block 3614.

Figure 23:
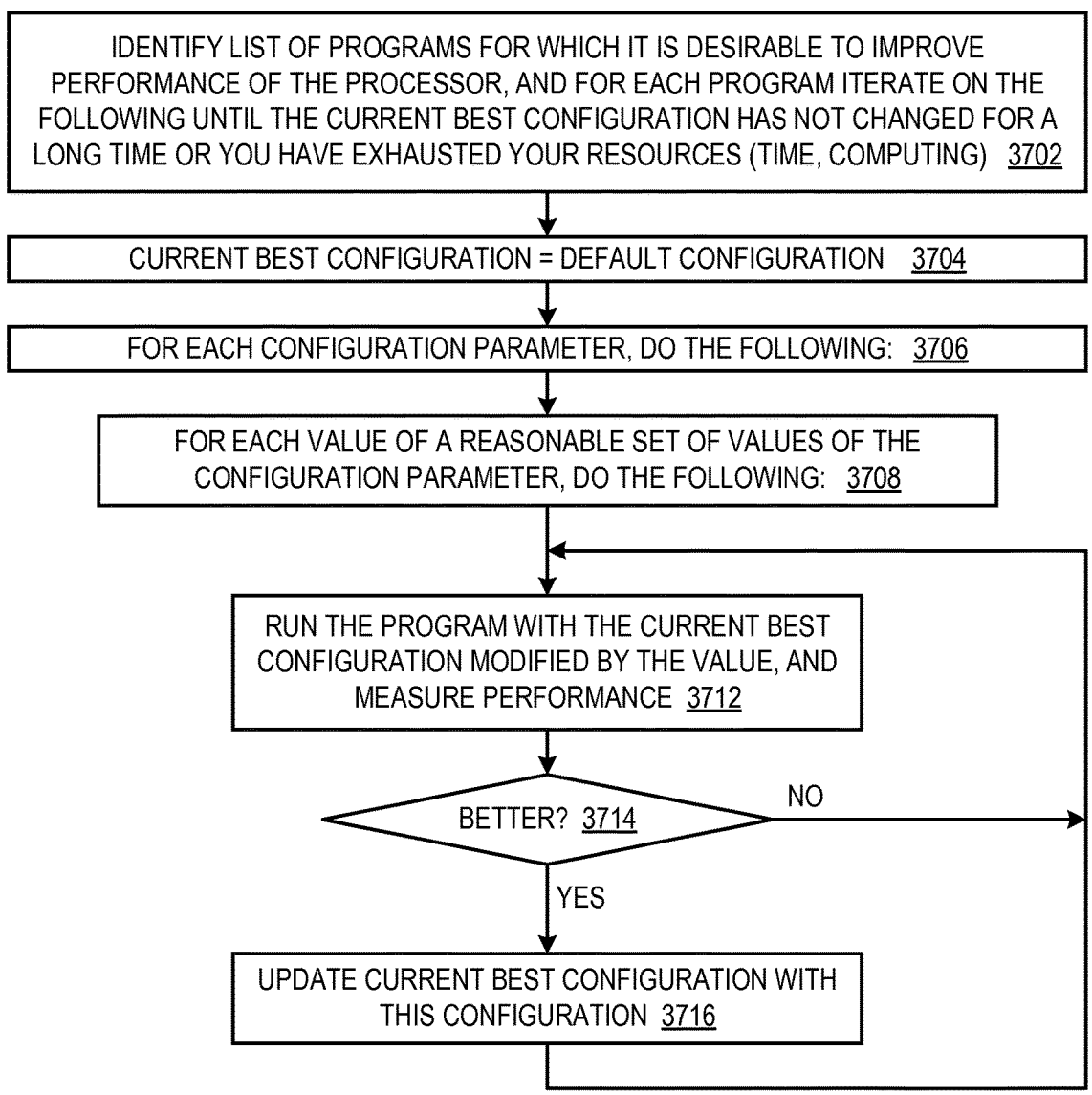
FIG. 23 is a flowchart illustrating a brute force method of determining a good configuration for configurable aspects of the processor.

Referring now to FIG. 23, a flowchart illustrating a brute force method of determining a good configuration for configurable aspects of the processor, e.g., cache memory, prefetcher, is shown. The method described employs aspects of the "coordinate descent" optimization algorithm. Flow begins at block 3702.

At block 3702, for each program, or program phases, in a list of programs identified for which it is desirable to improve performance of the processor, the method iterates through blocks 3704 through 3716 until a good configuration is determined (e.g., the best current configuration—see below—has not changed for a relatively long time) or resources have expired (e.g., time and/or computing resources). Flow proceeds to block 3704.

At block 3704, the current best configuration is set to a default configuration, e.g., a default mode of the cache memory, which in one embodiment is simply the configuration with which the processor is manufactured. Flow proceeds to block 3706.

At block 3706, for each configuration parameter, blocks 3708 through 3712 are performed. An example of a configuration parameter is a single configuration bit, e.g., that turns a feature on or off. Another example of a configuration parameter is a configuration field, e.g., mode 108. Flow proceeds to block 3708.

At block 3708, for each value of a reasonable set of values of the configuration parameter of block 3706, perform blocks 3712 through 3716. A reasonable set of values of the configuration parameter depends upon the size of the configuration parameter, the deemed importance of the parameter, and the amount of resources required to iterate through its values. For example, in the case of a single configuration bit, both values are within a reasonable set. For example, the method may try all possible values for any parameter having sixteen or fewer values. However, for relatively large fields, e.g., a 32-bit field, it may be infeasible to try all $2^{32}$ possible values. In this case, the designer may provide a reasonable set of values to the method. If the designer does not supply values and the number of possibilities is large, the method may iterate through blocks 3712 through 3716 with a reasonable number of random values of the parameter. Flow proceeds to block 3712.

At block 3712, the program, or program phase, is run with the current best configuration but modified by the next value of the parameter per block 3708, and the performance is measured. Flow proceeds to decision block 3714.

At decision block 3714, the method compares the performance measured at block 3712 with the current best performance and if the former is better, flow proceeds to block 3716; otherwise, flow returns to block 3712 to try the next value of the current parameter until all the reasonable values are tried, in which case flow returns to block 3708 to iterate on the next configuration parameter until all the configuration parameters are tried, in which case the method ends, yielding the current best configuration for the program, or program phase.

At block 3716, the method updates the current best configuration with the configuration tried at block 3712. Flow returns to block 3712 to try the next value of the current parameter until all the reasonable values are tried, in which case flow returns to block 3708 to iterate on the next configuration parameter until all the configuration parameters are tried, in which case the method ends, yielding the current best configuration for the program, or program phase.

It should be noted that a good configuration found using methods similar to those of FIG. 23 may not be, and need not be, understood by the designer why the particular configuration yields the good result.

Figure 24:
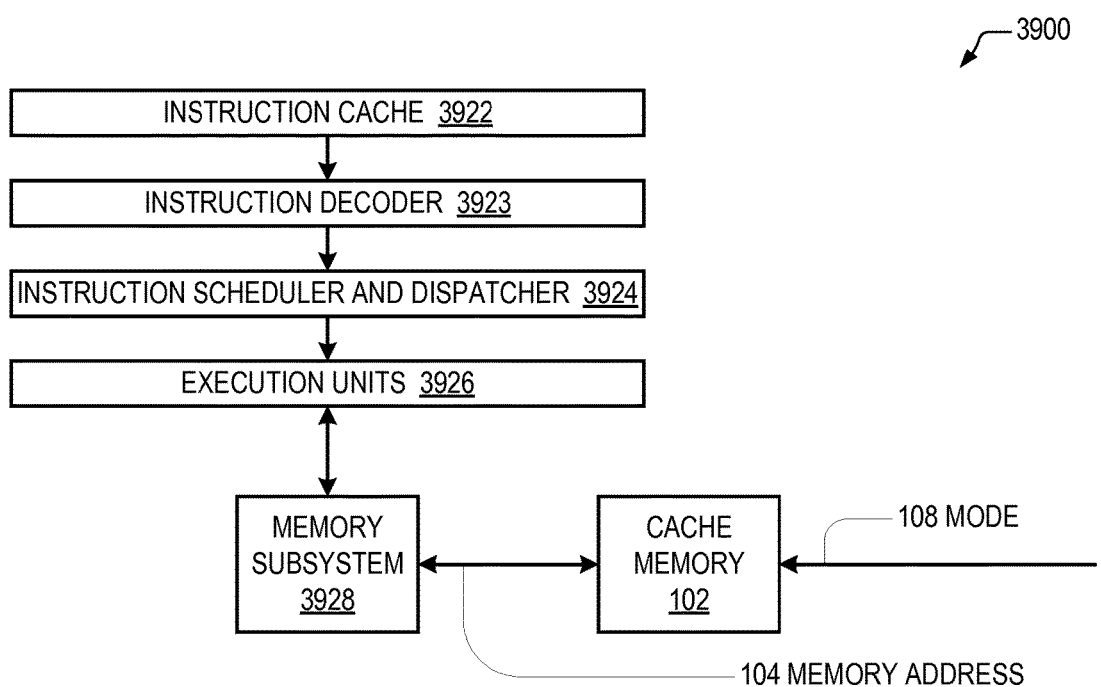
FIG. 24 is a block diagram illustrating a processor.

Referring now to FIG. 24, a block diagram illustrating a processor 3900 is shown. The processor 3900 includes an instruction cache 3922 that provides instructions to an instruction decoder 3923 that decodes the instructions and provides the decoded instructions to an instruction dispatcher 3924 that dispatches the instructions to execution units 3926 for execution. Preferably, the microarchitecture of the processor 3900 is superscalar and out-of-order execution, although other embodiments are contemplated, such that the instruction dispatcher 3924 also includes an instruction scheduler for scheduling the dispatch of instructions to multiple execution units 3926 in a superscalar out-of-order fashion. Preferably, the processor 3900 also includes architectural registers (not shown) that hold architectural state of the processor 3900 as well as non-architectural registers (not shown). Preferably, the processor 3900 also includes a register alias table (RAT) (not shown) used to perform register renaming and a reorder buffer (ROB) (not shown) used to retire instructions in program order. Preferably, the instruction dispatcher includes an instruction translator (not shown) that translates architectural instructions into microinstructions of the microinstruction set architecture of the processor 3900 executable by the execution units 3926.

The processor 3900 also includes a memory subsystem 3928 that provides memory operands to the execution units 3926 and receives memory operands from the execution units 3926. The memory subsystem 3928 preferably includes one or more load units, one or more store units, load queues, store queues, a fill queue for requesting cache lines from memory, a snoop queue related to snooping of a memory bus to which the processor 3900 is in communication, a tablewalk engine, and other related functional units.

The processor 3900 also includes a cache memory 102 in communication with the memory subsystem 3928. Preferably, the cache memory 102 is similar to the cache memories described with respect to FIGS. 1 (and 1602 of FIG. 16). Although a single cache memory 102 is shown, the cache memory 102 may be one of a larger cache memory subsystem that includes a hierarchy of cache memories, such as the level-1 (L1) instruction cache, a L1 data cache, and a unified level-2 (L2) cache that backs the L1 caches. In one embodiment, the cache subsystem also includes a level-3 (L3) cache. The processor 3900 may also include one or more prefetchers that prefetch data from memory into the cache memory 102. In one embodiment, the processor 3900 is a multi-core processor, each of the cores having the functional units described above, and in which the cache memory 102 shared by the cores.

The memory subsystem 3928 makes memory accesses of the cache memory 102 as described in the embodiments of FIGS. 1 through 23. The memory accesses include the memory address 104 of the memory location to be accessed.

Although embodiments have been described with a particular configuration of number of ports and banks of the cache memory, it should be understood that other embodiments are contemplated in which different numbers of ports are included in the cache memory, and in which different numbers of banks are included, as well as a non-banked configurations. In the present disclosure, including the claims, the notation 2^N means 2 to the exponent N.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A cache memory, comprising:
a mode input that indicates in which of a plurality of allocation modes the cache memory is to operate, wherein the plurality of allocation modes comprises a normal mode and a skinny mode;
a set-associative array of entries having a plurality of sets by W ways, wherein W is an integer greater than one;
an input that receives a memory address, wherein the memory address comprises:
an index used to select a set from the plurality of sets; and
a tag used to compare with tags stored in the entries of the W ways of the selected set to determine whether the memory address hits or misses in the array; and
allocation logic that, when the memory address misses in the array:
when the cache memory is operating in the normal mode, allocates into any one of the ways of the selected set;
when the cache memory is operating in the skinny mode;
selects two or more bits of the tag to be selected bits;
performs a function, selected from a plurality of functions based on the allocation mode, on the selected bits of the tag to generate a subset of the W ways of the array; and
allocates into one way of the subset of the ways of the selected set according to an output of the function;
wherein the cache memory is transitioned from one of the normal mode and the skinny mode to the other in response to detection that a new process is running on a processor that comprises the cache memory.

2. The cache memory of claim 1, wherein the plurality of functions performed on the selected bits of the tag comprises a Boolean exclusive-OR (XOR) of the two or more of the selected bits of the tag.

3. The cache memory of claim 2, wherein the output of the function performed on the selected bits of the tag generates a single bit, wherein when the bit is one the subset comprises odd-numbered ways of the W ways of the selected set, wherein when the bit is zero the subset comprises even-numbered ways of the W ways of the selected set.

4. The cache memory of claim 1, wherein for one or more of the plurality of allocation modes, the subset is one way of the W ways of the selected set.

5. The cache memory of claim 4, wherein W is $2^Q$, wherein the one way is specified by Q bits of the tag, wherein Q is an integer greater than zero.

6. The cache memory of claim 5, wherein the Q bits of the tag are the Q least significant bits of the tag.

7. A method for operating a cache memory having a set-associative array of entries having a plurality of sets by W ways, wherein W is an integer greater than one, the method comprising:
receiving a mode input that indicates in which of a plurality of allocation modes the cache memory is to operate, wherein the plurality of allocation modes comprises a normal mode and a skinny mode;
receiving a memory address comprising:
an index used to select a set from the plurality of sets; and
a tag used to compare with tags stored in the entries of the W ways of the selected set to determine whether the memory address hits or misses in the array; and
when the memory address misses in the array:
when the cache memory is operating in the normal mode, allocating into any one of the ways of the selected set
when the cache memory is operating in the skinny mode;
selecting two or more bits of the tag to be selected bits;
performing a function, selected from a plurality of functions based on the allocation mode, on the selected bits of the tag to generate a subset of the W ways of the array; and
allocating into one way of the subset of the ways of the selected set according to an output of the function;

wherein the cache memory is transitioned from one of the normal mode and the skinny mode to the other in response to detection that a new process is running on a processor that comprises the cache memory.

8. The method of claim 7, wherein the plurality of functions performed on the selected bits of the tag comprises a Boolean exclusive-OR (XOR) of the two or more of the selected bits of the tag.

9. The method of claim 8, wherein the output of the function performed on the selected bits of the tag generates a single bit, wherein when the bit is one the subset comprises odd-numbered ways of the W ways of the selected set, wherein when the bit is zero the subset comprises even-numbered ways of the W ways of the selected set.

10. The method of claim 7, wherein for one or more of the plurality of allocation modes, the subset is one way of the W ways of the selected set.

11. The method of claim 10, wherein W is $2^Q$, wherein the one way is specified by Q bits of the tag, wherein Q is an integer greater than zero.

12. The method of claim 11, wherein the Q bits of the tag are the Q least significant bits of the tag.

13. A method for operating a set associative cache memory, the method comprising:

operating the cache memory in a current allocation mode of a plurality of allocation modes, wherein the plurality of allocation modes comprises a normal mode and a skinny mode;

wherein upon a miss of a memory address in the cache memory;

in the normal mode, allocating into any one of the ways of the selected set;

in the skinny mode, the cache memory allocates into one way of any of a subset of the ways of a set of the cache memory selected using an index portion of the memory address;

wherein in the skinny mode, the subset is determined by a function, selected from a plurality of functions based on the allocation mode, of two or more bits, which are selected bits, of a tag portion of the memory address; and monitoring a hit rate of the cache memory while operating in the current allocation mode and changing the current allocation mode to a different one of the plurality of allocation modes when the hit rate is below a threshold;

wherein the cache memory is transitioned from one of the normal mode and the skinny mode to the other in response to detection that a new process is running on a processor that comprises the cache memory.

\* \* \* \* \*